(12) United States Patent
Paiva et al.

(10) Patent No.: US 11,115,284 B1
(45) Date of Patent: Sep. 7, 2021

(54) TECHNIQUES FOR DYNAMIC RATE-LIMITING

(71) Applicants: Atlassian PTY Ltd., Sydney (AU); Atlassian, Inc., San Francisco, CA (US)

(72) Inventors: Anre Mario Roshan Paiva, Mountain View, CA (US); Dean Shaft, Mountain View, CA (US); Bernice Chen, Mountain View, CA (US); Abhas Bodas, Mountain View, CA (US); David Mankin, Mountain View, CA (US); Martien Verbruggen, Sydney (AU); Aleksander Mierzwicki, Gdansk (PL); Andrei Beliaev, British Columbia (CA)

(73) Assignees: Atlassian PTY Ltd., Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 16/843,525

(22) Filed: Apr. 8, 2020

Related U.S. Application Data

(60) Provisional application No. 63/002,933, filed on Mar. 31, 2020.

(51) Int. Cl.
*G06F 15/173* (2006.01)
*H04L 12/24* (2006.01)
*H04L 29/08* (2006.01)

(52) U.S. Cl.
CPC ...... *H04L 41/0893* (2013.01); *H04L 41/5009* (2013.01); *H04L 41/5032* (2013.01); *H04L 67/289* (2013.01)

(58) Field of Classification Search
CPC ............. H04L 41/0893; H04L 41/5009; H04L 41/5032; H04L 67/289
(Continued)

(56) References Cited

U.S. PATENT DOCUMENTS

| | | | | |
|---|---|---|---|---|
| 7,516,325 | B2 * | 4/2009 | Willey | H04W 12/06 713/169 |
| 8,681,630 | B1 * | 3/2014 | Gibson | G06F 9/54 370/235 |

(Continued)

OTHER PUBLICATIONS

API Request Limits, Bitbucket Cloud, Atlassian Support [online] [Retrieved Aug. 27, 2020]. Retrieved from the Internet: <URL: https://confluence.atlassian.com/bitbucket/rate-limits-668173227.html>, 3 pages.

(Continued)

*Primary Examiner* — Alicia Baturay
(74) *Attorney, Agent, or Firm* — Alston & Bird LLP

(57) ABSTRACT

Systems and methods provide techniques for dynamic rate-limiting, such as techniques that utilize one or more of asynchronous rate-limiting, context-aware rate-limiting, and cost-aware rate-limiting. In one example, a method for asynchronous rate-limiting includes the steps of receiving a rate-limiting request for a service application; extracting one or more policy-defining parameters from the rate-limiting request; querying a local cache storage medium associated with the rate-limit decision node to identify one or more local rate-limiting policies associated with the rate-limiting request; determining, based on the one or more policy-defining parameters and the one or more local rate-limiting policies, a rate-limiting decision for the rate-limiting request; and transmitting the rate-limiting decision to the service application in response to the rate-limiting request.

20 Claims, 11 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 8,719,804 | B2* | 5/2014 | Jain | G06F 11/3089 |
| | | | | 717/140 |
| 8,918,535 | B2* | 12/2014 | Ma | H04L 65/4084 |
| | | | | 709/232 |
| 9,560,174 | B2* | 1/2017 | Newton | H04L 47/2408 |
| 9,660,948 | B2* | 5/2017 | Dubman | H04L 43/04 |
| 9,667,704 | B1* | 5/2017 | Sonawane | H04L 67/10 |
| 9,769,050 | B2* | 9/2017 | Herdrich | H04L 41/5009 |
| 9,959,198 | B1* | 5/2018 | Jha | G06F 11/3664 |
| 9,991,993 | B2* | 6/2018 | Bock | H04L 1/188 |
| 10,049,371 | B2* | 8/2018 | Savelli | G06Q 50/01 |
| 10,084,783 | B2* | 9/2018 | Dubman | H04L 12/2825 |
| 10,178,046 | B1* | 1/2019 | Murugesan | H04L 47/783 |
| 10,187,256 | B2* | 1/2019 | Jha | H04L 67/1095 |
| 10,311,453 | B2* | 6/2019 | Savelli | H04L 67/22 |
| 10,397,228 | B2* | 8/2019 | Dubman | H04L 63/10 |
| 10,445,151 | B1* | 10/2019 | Ko | G06F 9/541 |
| 10,454,974 | B2* | 10/2019 | Reddem | H04L 63/0884 |
| 10,462,056 | B2* | 10/2019 | Zhu | H04L 49/3027 |
| 10,462,138 | B2* | 10/2019 | Jhingran | G06F 21/629 |
| 10,469,404 | B1* | 11/2019 | Mao | H04L 67/16 |
| 10,621,263 | B2* | 4/2020 | Holloway | H04L 63/126 |
| 10,630,539 | B2* | 4/2020 | Tubillara | H04L 41/5025 |
| 10,740,287 | B2* | 8/2020 | Haviv | G06F 16/27 |
| 2019/0372913 | A1* | 12/2019 | Leyrer | H04L 49/20 |
| 2020/0044968 | A1* | 2/2020 | Zhu | H04L 45/745 |
| 2020/0220848 | A1* | 7/2020 | Patwardhan | H04L 45/64 |
| 2021/0044497 | A1* | 2/2021 | Lu | H04L 47/82 |

OTHER PUBLICATIONS

How users are organized, Asana Developers [online] [Retrieved Aug. 27, 2020]. Retrieved from the Internet: <URL: https://asana.com/developers/documentation/getting-started/rate-limits>, 332 pages.

Rate Limit Policy, Auth0 Does [online] [Retrieved Aug. 27, 2020]. Retrieved from the Internet: <URL: https://auth0.com/docs/policies/rate-limits>, 6 pages.

Rate Limits—Docs—Twitter Developer [online] [Retrieved Aug. 27, 2020], Retrieved from the Internet: <URL: https://developer.twitter.com/en/docs/twitter-ads-api/rate-limiting>, 3 pages.

Rate Limits—Docs—Twitter Developer [online] [Retrieved Aug. 27, 2020]. Retrieved from the Internet: <URL: https://developer.twitter.com/en/docs/twitter-api/rate-limits>, 3 pages.

Rate Limits—Docs—Twitter Developer [online] [Retrieved Aug. 27, 2020]. Retrieved from the Internet: <URL: https://developer.twitter.com/en/docs/twitter-api/v1/rate-limits>, 3 pages.

Rate Limits—Graph API Documentation, Facebook for Developers [online] [Retrieved Aug. 27, 2020]. Retrieved from the Internet: <URL: https://developers.facebook.com/docs/graph-api/overview/rate-limiting>, 6 pages.

Rate Limits, Slack API [online] [Retrieved Aug. 27, 2020], Retrieved from the Internet: <URL: https://api.slack.com/docs/rate-limits>, 9 pages.

Twitch Developers Guide [online] [Retrieved Aug. 27, 2020]. Retrieved from the Internet: <URL: https://dev.twitch.tv/docs/api/guide/#rate-limits>, 5 pages.

* cited by examiner

```
local_counters: [  901
    key: "<key>",  902
    counter: "<counter value>",  903
    prev_counter: <value obtained from the RLS since the last sync>  904
    interval_start_time: "",  905
    interval_end_time: ""  906
}
```

FIG. 9

```
{
  counters: [ { key: "<key>", counter: "<consolidated counter value>",
  calculated_time: "" } ],     1012
                1011     1013
  configuration: {
    // optional: it can pass back configurations for this service if
    anything has changed recently
    key: <tenant? user? req_path>,  1021
    value: <tenantID, userId, the request path, or *>,  1022
    unit: <second, minute, hour, day>,  1023
    algorithm: <token_bucket, fixed_window, etc  1024
  }
}
```

FIG. 10

TECHNIQUES FOR DYNAMIC RATE-LIMITING

CROSS REFERENCE TO RELATED APPLICATIONS

This application is a continuation of provisional U.S. Patent Application No. 63/002,933, titled "Techniques For Dynamic Rate-Limiting," filed Mar. 31, 2020, which is incorporated by reference herein in its entirety.

BACKGROUND

Various methods, apparatuses, and systems are configured to provide techniques for rate-limiting. Applicant has identified many deficiencies and problems associated with existing methods, apparatuses, and systems for rate-limiting. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable dynamic rate-limiting. For example, certain embodiments of the present invention provide methods, apparatuses, systems, computing devices, and/or the like that are configured to enable dynamic rate-limiting using at least one of asynchronous rate-limiting, context-aware rate-limiting, and cost-aware rate-limiting.

In accordance with one aspect, a method is provided. In one embodiment, the method comprises: receive a rate-limiting request for a service application at a rate-limit decision node; extract one or more policy-defining parameters from the rate-limiting request; query a local cache storage medium associated with the rate-limit decision node to identify one or more local rate-limiting policies associated with the rate-limiting request; determine, based on the one or more policy-defining parameters and the one or more local rate-limiting policies, a rate-limiting decision for the rate-limiting request; and transmit the rate-limiting decision to the service application in response to the rate-limiting request.

In accordance with another aspect, a computer program product is provided. The computer program product may comprise at least one computer-readable storage medium having computer-readable program code portions stored therein, the computer-readable program code portions comprising executable portions configured to: receiving a rate-limiting request for a service application at a rate-limit decision node; extracting one or more policy-defining parameters from the rate-limiting request; querying a local cache storage medium associated with the rate-limit decision node to identify one or more local rate-limiting policies associated with the rate-limiting request; determining, based on the one or more policy-defining parameters and the one or more local rate-limiting policies, a rate-limiting decision for the rate-limiting request; and transmitting the rate-limiting decision to the service application in response to the rate-limiting request.

In accordance with yet another aspect, an apparatus comprising at least one processor and at least one memory including computer program code is provided. In one embodiment, the at least one memory and the computer program code may be configured to, with the processor, cause the apparatus to: receive a rate-limiting request for a service application at a rate-limit decision node; extract one or more policy-defining parameters from the rate-limiting request; query a local cache storage medium associated with the rate-limit decision node to identify one or more local rate-limiting policies associated with the rate-limiting request; determine, based on the one or more policy-defining parameters and the one or more local rate-limiting policies, a rate-limiting decision for the rate-limiting request; and transmit the rate-limiting decision to the service application in response to the rate-limiting request.

BRIEF DESCRIPTION OF THE SEVERAL VIEW OF THE DRAWINGS

Having thus described some embodiments in general terms, references will now be made to the accompanying drawings, which are not drawn to scale, and wherein:

FIG. 9 provides an operational example of a node-originated counter data update payload in accordance with at least some embodiments of the present invention.

FIG. 10 provides an operational example of asynchronous configuration data update payload in accordance with at least some embodiments of the present invention.

Figure 11:
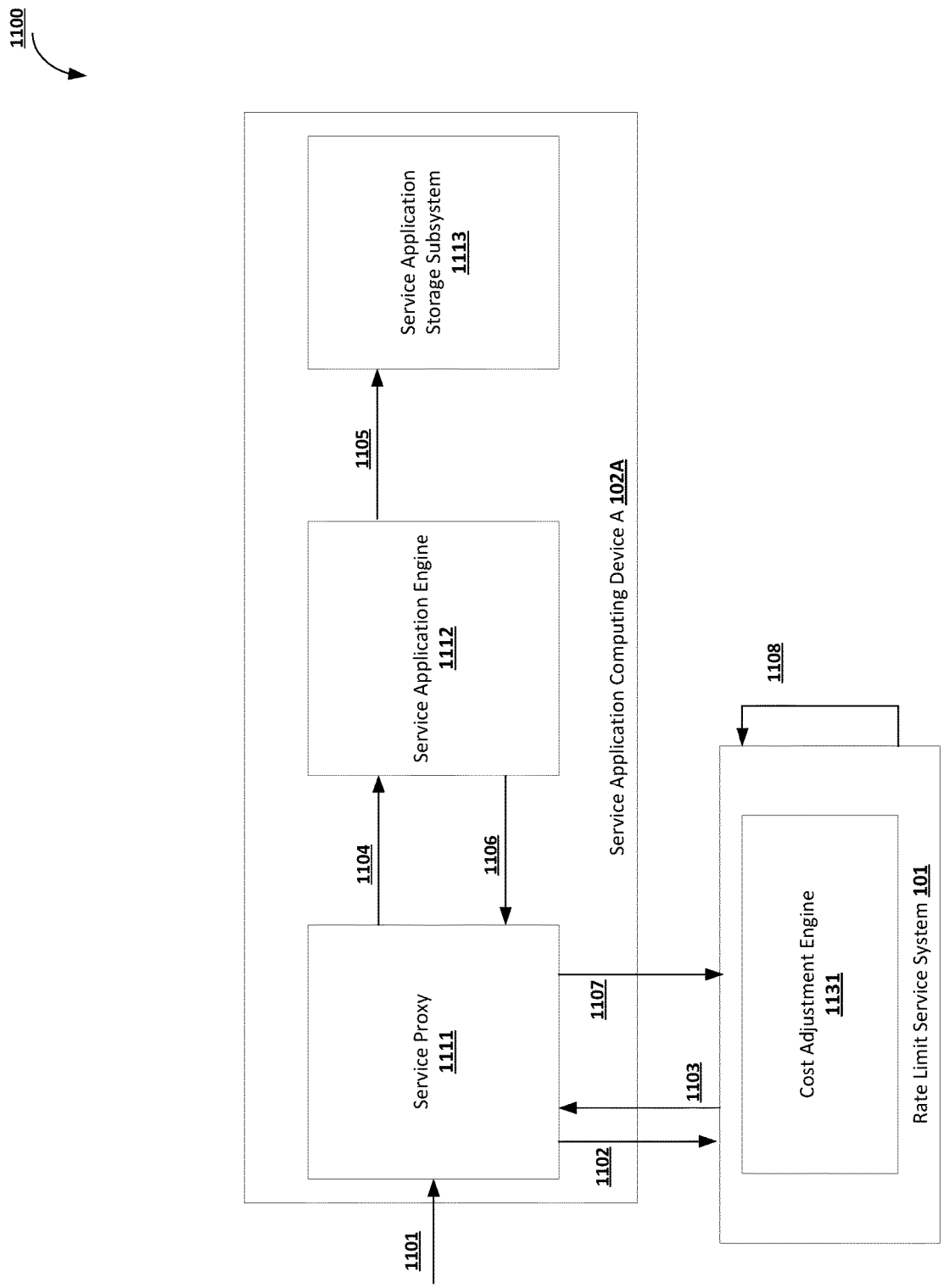

FIG. 11 is a dataflow diagram of an example process for performing cost-aware rate-limiting in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative,"

"example," and "exemplary" are used to be examples with no indication of quality level. Like numbers refer to like elements throughout.

Overview

Various embodiments of the present invention enable techniques for improving efficiency and reliability of rate-limit service systems that utilize at least one of asynchronous rate-limiting, context-aware rate-limiting, and cost-aware rate-limiting. As further described below, by disclosing those techniques, various embodiments of the present invention make important contributions to improving efficiency and reliability of existing rate-limit service systems as well as important technical contributions to the field of network performance optimization studies.

Various embodiments of the present invention improve efficiency and reliability of rate-limit service systems by utilizing asynchronous rate-limiting. For example, in some embodiments, rate-limit decision nodes store local rate-limiting configuration data in their respective local cache storage media rather than making remote server requests for such rate-limiting configuration data. The rate-limit decision nodes utilize the noted local rate-limiting configuration data to perform rate-limiting decision-making at extremely low latency.

In some embodiments, the local rate-limiting configuration data stored to the local cache storage media is asynchronously (i.e., independently of the rate-limiting decision-making processes) updated based on asynchronous rate-limiting configuration data updates provided by rate-limit synchronization servers that collect and propagate changes to rate-limiting configuration data. By decoupling rate-limiting decision-making from rate-limiting configuration data updating/synchronization and thus performing rate-limiting decision-making based entirely on locally-stored data, the noted embodiments of the present invention improve operational efficiency of performing rate-limit decision-making by rate-limit service systems.

Utilizing local cache storage media to store rate-limiting configuration data and asynchronously updating such data provides another important benefit. In the event that a rate-limiting configuration data update/synchronization operation fails or a rate-limit synchronization server becomes unavailable, such failure causes the system to "fail open" in that it leaves the last version of locally-stored rate limit configuration data in place and available to a corresponding rate-limit decision node. Thus, such rate-limit decision nodes remain available to perform their rate limiting function even following update/synchronization errors or server unavailability.

Various embodiments of the present invention improve efficiency and reliability of rate-limit service systems by utilizing context-aware rate-limiting. For example, in some embodiments, rate-limit service systems provide administrators of service applications the ability to modify global rate-limit policy data using interactions with the rate-limit synchronization servers. By providing the ability to modify global rate-limit policy data using interactions with the rate-limit synchronization servers, various embodiments of the present invention enable the system to perform reliable and efficient modifications to the behavior of the rate-limit decision nodes associated with the rate-limit synchronization servers through interaction with centralized end-points. The rate-limit service system is thus configured to be reactive and dynamic system circumstances in ways not possible in convention systems.

Providing for efficient modification of global rate-limit policy data using interactions with the rate-limit synchronization servers that are also configured to store the noted global rate-limit policy data also enables various embodiments of the present invention to decrease the reliability challenges resulting from potential loss of global rate-limit policy data updates before final application of the changes to the global rate-limit policy data in accordance with the noted global rate-limit policy data updates. Thus, perhaps similar to the "fail open" benefit noted above, the context-aware rate-limiting embodiments herein described also increase the efficiency, the reliability, and the operational flexibility of rate-limit service systems.

Various embodiments of the present invention improve efficiency and reliability of rate-limit service systems by utilizing cost-aware rate-limiting. For example, in some embodiments, rate-limit service systems enable adjusting rate-limiting counters based on estimated resource costs of allowed (i.e., not limited) data access operations. In doing so, various embodiments of the present invention provide techniques for reducing the allowability of resource-intensive data access operations, which in turn reduces the operational load of such resource-intensive data access operations for the rate-limit service systems. Accordingly, by enabling techniques for adjusting rate-limiting counters based on estimated resource costs of allowed data access operations, the noted embodiments of the present invention improve the efficiency and reliability of rate-limit server systems.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" or "tenant computing device" refers to computer hardware and/or software that is configured to access a service (e.g., one or more service applications) made available by a server. The server is often (but not always) on another computer system, in which case the client computing device accesses the service by way of a network. Client computing devices may include, without limitation, smart phones, tablet computers, laptop computers, wearables, personal computers, enterprise computers, and the like.

The term "rate-limiting request" refers to a data item and associated instructions that describe a request to obtain a rate-limiting decision for a service request to a service application from a rate-limit decision node associated with the service application. For example, the rate-limiting request may be a request by the service application to obtain a rate-limiting decision in relation to the service request directed to the service application. As another example, the rate-limiting request may be a request by a service proxy (e.g., a web-based service proxy) associated with the service application to obtain a rate-limiting decision in relation to the service request directed to the service proxy.

The term "service application" refers to a software application that is configured to obtain service requests from tenant computing devices and perform one or more computing actions with respect to the service requests. In some embodiments, when service requests include one or more data retrieval requests, the service application may be configured to generate service application outputs for transmission to the tenant computing devices in responses to the service requests. A service application may include one or more of at least one microservice application, at least one application programming interface (API) gateway application, at least one service proxy application, and at least one proxy application. A service application may be configured to transmit rate-limiting requests to a rate-limit decision node associated with the service application and obtain rate-limiting decisions from the decision nodes in response to the rate-limiting requests. A service application may utilize a service proxy associated with the service application to communicate with the tenant computing devices associated with the service application and/or with the rate-limit decision nodes associated with the service application.

The term "rate-limit decision node" refers to a computing device that is configured to maintain synchronized local rate-limiting configuration data in a local cache storage medium of the rate-limit decision node and to process rate-limiting requests associated with the service applications in accordance with the synchronized local rate-limiting configuration data. Accordingly, functionalities performed by a rate-limit decision node include local rate-limiting configuration data synchronization functionalities and rate-limiting request processing functionalities. To perform the local rate-limiting configuration data synchronization functionalities, a rate-limit decision node may be configured to periodically receive asynchronous configuration data updates from a rate-limit synchronization server and update the synchronized local rate-limiting configuration data in accordance with the received asynchronous configuration data updates. To perform the rate-limiting request processing functionalities, a rate-limit decision node may be configured to receive rate-limiting requests associated with service applications, process the rate-limiting requests in accordance with local rate-limiting configuration data maintained in a local cache storage medium of the rate-limit decision node in order to generate a rate-limiting decision for each received rate-limiting request, and transmit the generated rate-limiting decisions to the service applications.

The term "local cache storage medium" refers to a storage repository that is maintained by a rate-limit decision node as part of the storage media for the rate-limit decision node in order to enable faster retrieval of data to support low-latency rate-limit decisions. The local cache storage medium may have a single-level or multi-level cache storage structure, such as a hierarchical multi-level cache storage structure. Examples of cache storage media that may be utilized by embodiments of the present invention include static random-access memory (SRAM) caches and dynamic random-access memory (DRAM) caches.

The term "rate-limiting configuration data" refers to a data and associated instructions that describe guidelines/requirements for determining and executing rate-limiting decisions in response to rate-limiting requests associated with a group of service applications. Examples of rate-limiting configuration data include rate-limiting policies, rate-limiting counters, local rate-limiting configuration data, and global rate-limiting configuration data, all of which are described in greater detail below.

The term "local rate-limiting configuration data" refers to rate-limiting configuration data maintained by a rate-limit decision node in a local cache storage medium. The local rate-limiting configuration data maintained by a rate-limit decision node may be modified in accordance with asynchronous configuration data updates from a rate-limit synchronization server associated with the local rate-limit decision node. Rate-limit decision nodes utilize their maintained local rate-limiting configuration data to determine rate-limiting decisions in response to rate-limiting requests associated with service applications. Examples of local rate-limiting configuration data include local rate-limiting policies and local rate-limiting counters.

The term "global rate-limiting configuration data" refers to rate-limiting configuration data maintained by a rate-limit synchronization server. The global rate-limiting configuration data maintained by a rate-limit synchronization server may be used to generate asynchronous configuration data updates for transmission to rate-limit decision nodes in order to cause the rate-limit decision nodes to asynchronously update the local rate-limiting configuration data stored to their local cache storage mediums. Examples of global rate-limiting configuration data include global rate-limiting policies and global rate-limiting counters.

The term "rate-limiting policy" refers to a data and associated instructions that describe guidelines/requirements for determining rate-limiting decisions for a defined category of rate-limiting requests associated with the service application. Accordingly, a rate-limiting policy defines a category of rate-limiting requests for a service application that are associated with the rate-limiting policy as well as guidelines/requirements (e.g., threshold counts) for when a service category in the defined category should be associated with an affirmative or a negative rate-limiting decision. For example, a rate-limiting policy may define that rate-limiting requests by a particular tenant identifier should be analyzed in accordance with a sliding window rate-limiting algorithm and should be allowed up to five times per minute. As another example, a rate-limiting policy may define that rate-limiting requests by a particular tenant identifier should be analyzed in accordance with a sliding window rate-limiting algorithm and should be allowed up to five times per minute for each user identifier associated with the particular tenant identifier. Examples of rate-limiting policies include local rate-limiting policies maintained by a rate-limit decision node and global rate-limiting policies maintained by a rate-limit synchronization server. In some embodiments, a rate-limiting policy may define a rate-limiting threshold for each rate-limiting request to which the rate-limiting policy applies, where the rate-limiting threshold maybe a static rate-limiting threshold or a dynamic rate-limiting threshold (e.g., a dynamic rate-limiting threshold that is determined at runtime based on one or more of an overall system load of a dynamic rate-limiting service application, a timestamp of the rate-limiting request, a tenant identifier of the rate-limiting request, a user identifier of the rate-limiting request, and a region identifier of the rate-limiting request).

The term "local rate-limiting policy" refers to a rate-limiting policy that is maintained in the local cache storage medium of a rate-limit decision node. The local rate-limiting policy data maintained by a rate-limit decision node may be modified in accordance with asynchronous policy data updates from a rate-limit synchronization server associated with the local rate-limit decision node. The rate-limit decision nodes utilize their maintained local rate-limiting policy data to determine rate-limiting decisions for rate-limiting requests associated with service applications. A collection of one or more local rate-limiting policies maintained by a corresponding rate-limit decision node is herein sometimes referred to as the "local rate-limiting policy data" maintained by the corresponding rate-limit decision node.

The term "global rate-limiting policy" refers to a rate-limiting policy that is maintained by a rate-limit synchronization server. The global rate-limiting policy data maintained by a rate-limit synchronization server may be used to generate asynchronous policy data updates for transmission to rate-limit decision nodes in order to cause the rate-limit decision nodes to asynchronously update their local rate-limiting policy data. A rate-limit synchronization server may store the global rate-limiting policy data in a hard disk or other permanent storage media associated with the rate-limit synchronization server (e.g., using a DynamoDB-based storage architecture). A rate-limit synchronization server may store the global rate-limiting policy data as a collection of one or more relational database tables (e.g., using DynamoDB global tables). A collection of one or more global rate-limiting policies maintained by a corresponding rate-limit synchronization server is herein sometimes referred to as the "global rate-limiting policy data" maintained by the corresponding rate-limit synchronization server.

The term "policy-defining parameter" refers to a data item that describes extractable features of a rate-limiting request transmitted to a rate-limit decision node, where the noted extractable features collectively associate the rate-limiting request with local rate-limiting configuration for the rate-limiting request, such as with a related subset of the local rate-limiting policies maintained in the local cache storage medium of the rate-limit decision node. For example, a policy-defining parameter extracted from a rate-limiting request may describe a particular tenant identifier associated with the rate-limiting request, and the local rate-limiting configuration data maintained by the corresponding rate-limit decision node may relate the particular tenant identifier to a particular local rate-limiting policy maintained by the rate-limit decision node. As another example, a policy-defining parameter extracted from a rate-limiting request may describe a particular tenant identifier and a particular user identifier associated with the rate-limiting request, and the local rate-limiting configuration data maintained by the corresponding rate-limit decision node may relate a subset of user identifiers of the particular tenant that includes the particular user identifier to a particular local rate-limiting policy maintained by the rate-limit decision node. As yet another example, a policy-defining parameter extracted from a rate-limiting request may describe a particular tenant identifier and a particular user identifier associated with the rate-limiting request, and the local rate-limiting configuration data maintained by the corresponding rate-limit decision node may: (i) relate the particular tenant identifier to a particular local rate-limiting policy maintained by the rate-limit decision node, and (ii) define a local rate-limiting counter for the particular user identifier with respect to the particular local rate-limiting policy.

The term "rate-limiting counter" refers to a hardware and associated software that is configured to measure and record a defined group of rate-limiting requests that satisfy conditions defined by a rate-limiting policy associated with the rate-limiting counter and that have been associated with affirmative rate-limiting decisions by rate-limit decision nodes associated with a rate-limit service system. For example, if a particular rate-limiting policy enables a particular tenant identifier to retrieve data from a service application twice every ten seconds, the rate-limiting counter for the particular tenant identifier may describe the number of successful data retrieval requests by the particular tenant identifier with respect to the service application within the less ten seconds. As another example, if a particular rate-limiting policy enables each user identifier of a particular tenant identifier to retrieve data from a service application twice every ten seconds, the rate-limiting counter for a particular user identifier of the particular tenant identifier may describe the number of successful data retrieval requests by the particular tenant identifier with respect to the service application within the last ten seconds.

The term "local rate-limiting counter" refers to a rate-limiting counter that is maintained in the local cache storage medium of a rate-limit decision node. The local rate-limiting counter data maintained by a rate-limit decision node may be modified in accordance with asynchronous counter data updates from a rate-limit synchronization server associated with the local rate-limit decision node. The rate-limit decision nodes utilize their maintained local rate-limiting counter data to determine rate-limiting decisions for rate-limiting requests associated with service applications. A collection of one or more local rate-limiting counters maintained by a corresponding rate-limit decision node is herein sometimes referred to as the "local rate-limiting counter data" maintained by the corresponding rate-limit decision node.

The term "global rate-limiting counter" refers to a rate-limiting counter that is maintained by a rate-limit synchronization server. The global rate-limiting counter data maintained by a rate-limit synchronization server may be used to generate asynchronous counter data updates for transmission to rate-limit decision nodes in order to cause the rate-limit decision nodes to asynchronously update their local rate-limiting counter data. A rate-limit synchronization server may store the global rate-limiting counter data in a main memory or other transitory storage media associated with the rate-limit synchronization server (e.g., using a Redis-based data storage architecture). A rate-limit synchronization server may store the global rate-limiting counter data as a collection of one or more key-value pairs (e.g., using a Redis-based data storage format). A collection of one or more global rate-limiting counters maintained by a corresponding rate-limit synchronization server is herein sometimes referred to as the "global rate-limiting counter data" maintained by the corresponding rate-limit synchronization server.

The term "rate-limiting decision" refers to a data item that describes a determination by a rate-limit decision node about whether local rate-limiting configuration data associated with a rate-limiting request instructs that the rate-limiting request should be permitted to cause performance of computing operations requested by the rate-limiting request. When the rate-limiting decision describes that the local rate-limiting configuration data associated with the rate-limiting request instructs that the rate-limiting request should be permitted to cause performance of the computing operations requested by the rate-limiting request, the rate-limiting decision is herein referred to as an "affirmative rate-limiting decision." However, when the rate-limiting decision describes that the local rate-limiting configuration data associated with the rate-limiting request instructs that the rate-limiting request should bit be permitted to cause performance of the computing operations requested by the rate-limiting request, the rate-limiting decision is herein referred to as a "negative rate-limiting decision." The rate-limiting decision may be transmitted to a service application by the rate-limit decision node that has generated the rate-limiting decision.

The term "per-policy rate-limiting determination" refers to a data item that describes a determination by a rate-limit decision node about whether, given a local rate-limiting policy that has been determined to be applicable to a rate-limiting request, a local rate-limiting counter maintained by the rate-limit decision node for the rate-limiting request with respect to the local rate-limiting policy satisfies the guidelines/requirements of the local rate-limiting policy. For example, given a local rate-limiting policy enabling a ceiling of two data retrieval requests by a tenant identifier every five minutes, the per-policy rate-limiting determination for a data retrieval request by the tenant identifier may describe whether the local rate-limiting count for data retrieval requests by the tenant identifier within the last five minutes exceeds two. As another example, given a local rate-limiting policy enabling a ceiling of two data retrieval requests by each user identifier of a tenant identifier every five minutes, the per-policy rate-limiting determination for a data retrieval request by the tenant identifier may describe whether the local rate-limiting count for data retrieval requests by a requesting user identifier of the tenant identifier within the last five minutes exceeds two.

When a local rate-limiting counter maintained by a rate-limit decision node for the rate-limiting request with respect to a local rate-limiting policy satisfies the guidelines/requirements of the local rate-limiting policy, the determined per-policy rate-limiting determination is herein referred to as an "affirmative per-policy rate-limiting determination." However, when a local rate-limiting counter maintained by the rate-limit decision node for a rate-limiting request with respect to a local rate-limiting policy fails to satisfy the guidelines/requirements of the local rate-limiting policy, the determined per-policy rate-limiting determination is herein referred to as a "negative per-policy rate-limiting determination."

The term "synchronized local rate-limiting counter" refers to a data item that describes the value of a local rate-limiting counter maintained by a rate-limit decision node prior to updating the local rate-limiting counter in response to determining an affirmative rate-limiting decision for a rate-limiting request that is associated with a local rate-limiting policy for the local rate-limiting counter. In some embodiments, in response to a rate-limit decision node determining an affirmative rate-limiting decision for a rate-limiting request based on one or more local rate-limiting counters for the rate-limiting request, the values of the local rate-limiting counters are updated to reflect the determination of the affirmative rate-limiting decision that may cause the service application to enable a service request associated with the rate-limiting request. In some of the noted embodiments, the pre-update values of the local rate-limiting counters that are associated with the rate-limiting request are maintained using corresponding synchronized local rate-limiting counters that may be transmitted to the rate-limit synchronization server associated with the rate-limit decision node.

The term "counter update measure" refers to a data item that describes a measure of how much a corresponding local rate-limiting counter should be increased by a rate-limit decision node in response to determining an affirmative rate-limiting decision for a rate-limiting request that is associated with a local rate-limiting policy for the local rate-limiting counter. In some embodiments, the counter update measure for each rate-limiting request that is associated with an affirmative rate-limiting decision is one. In some embodiments, the counter update measure for each rate-limiting request that is associated with an affirmative rate-limiting decision is determined based on an estimated resource cost of a service request that is associated with the rate-limiting request. For example, the counter update measure for a rate-limiting request that is associated with a target data retrieval service request may be determined based on a size of the target data and/or based on the cost of searching the target data within a data repository associated with the corresponding tenant identifier. In some embodiments, the estimated resource cost of a service request may be determined based on data provided by the service application associated with the rate-limiting request and/or in accordance with a service request resource cost model maintained by the rate-limit decision node.

The term "asynchronous configuration data update" refers to a data and associated instructions that are transmitted by a rate-limit synchronization server to rate-limit decision nodes associated with the rate-limit synchronization server at a time selected by the rate-limit synchronization server independently of any rate-limit decision-making operation by the rate-limit decision nodes. The asynchronous configuration data updates are configured to describe any changes to at least an identified portion of global asynchronous configuration data maintained by the rate-limit synchronization server. Examples of asynchronous configuration data updates are asynchronous policy data updates and asynchronous counter data updates. An asynchronous policy data update refers to an asynchronous configuration data update that describes any changes to a global rate-limiting policy, while an asynchronous counter data update refers to an asynchronous configuration data update that describes any changes to a global rate-limiting counter. Examples of asynchronous configuration data updates include HTTP POST packets, Simple Notification Service (SNS) messages, Open Policy Agent broadcasts.

The term "configuration data update propagation time" refers to a data item that describes a time interval during which a rate-limit synchronization server collectively transmits any asynchronous configuration data updates that have not previously been transmitted to rate-limit decision nodes associated with the rate-limit synchronization server to the noted rate-limit decision nodes. In some embodiments, the rate-limit synchronization server collectively transmits all outstanding asynchronous configuration data updates (e.g., including all outstanding asynchronous policy data updates as well as all outstanding asynchronous counter data updates) as part of one transmission at a particular transmission time interval. The noted particular transmission time interval is an example of a time interval that may be described by a configuration data update propagation time. In some embodiments, a configuration date update propagation time is a counter data update propagation time.

The term "counter data update propagation time" refers to a configuration data update propagation time that is selected based on state of changes to global rate-limiting counter data maintained by a corresponding rate-limit synchronization server. In some embodiments, the rate-limit synchronization server first determines whether there have been any changes to the global rate-limiting counter data; if so, the rate-limit synchronization server transmits both outstanding asynchronous policy data updates as well as all outstanding asynchronous counter data updates as part of one transmission at a particular transmission time that is subsequent to detecting changes to the global rate-limiting counter data. The noted particular transmission time interval is an example of a time interval that may be described by a counter data update propagation time.

The term "tenant identifier" refers to a data item that describes an organizational entity and/or a client system associated with a data access request in relation to a service application, where the data access request has caused the service application to transmit a corresponding rate-limiting request to a rate-limit decision node associated with the service application. The tenant identifier of a service application may be described by an entry in a Hyper-Text Transfer Protocol (HTTP) header and/or a predefined portion of the payload of an HTTP packet associated with the rate-limiting request.

The term "user identifier" refers to a data item that describes a user profile associated with a tenant identifier, where the user identifier is associated with a data access request in relation to a service application, and where the data access request has caused the service application to transmit a corresponding rate-limiting request to a rate-limit decision node associated with the service application. The user identifier of a service application may be described by an entry in an HTTP header and/or a predefined portion of the payload of an HTTP packet associated with the rate-limiting request.

The term "decision latency period" refers to a data item that describes a preferred time interval between receiving a rate-limiting request by a rate-limit decision node and transmission of a rate-limiting decision for the rate-limiting request to a service application that is associated with the rate-limiting request. In some embodiments, structuring a rate-limit server system as a combination of a rate-limit synchronization server providing asynchronous configuration data updates to rate-limit decision nodes that are configured to maintain local rate-limiting configuration data is meant to decrease the decision latency period for the rate-limit decision nodes by decoupling rate-limiting configuration data synchronization processes from rate-limiting decision-making processes. For example, experimental results have shown that utilizing the noted software architecture for a rate-limit synchronization server can reduce the decision latency period to less than or equal to one millisecond.

Example System Architecture

Methods, apparatuses, and computer program products of the present invention may be embodied by any of a variety of computing devices. For example, the method, apparatus, and computer program product of an example embodiment may be embodied by a networked computing device (e.g., an enterprise platform), such as a server or other network entity, configured to communicate with one or more computing devices, such as one or more query-initiating computing devices. Additionally or alternatively, the computing device may include fixed computing devices, such as a personal computer or a computer workstation. Still further, example embodiments may be embodied by any of a variety of mobile computing devices, such as a portable digital assistant (PDA), mobile telephone, smartphone, laptop computer, tablet computer, wearable, or any combination of the aforementioned computing devices.

Figure 1:
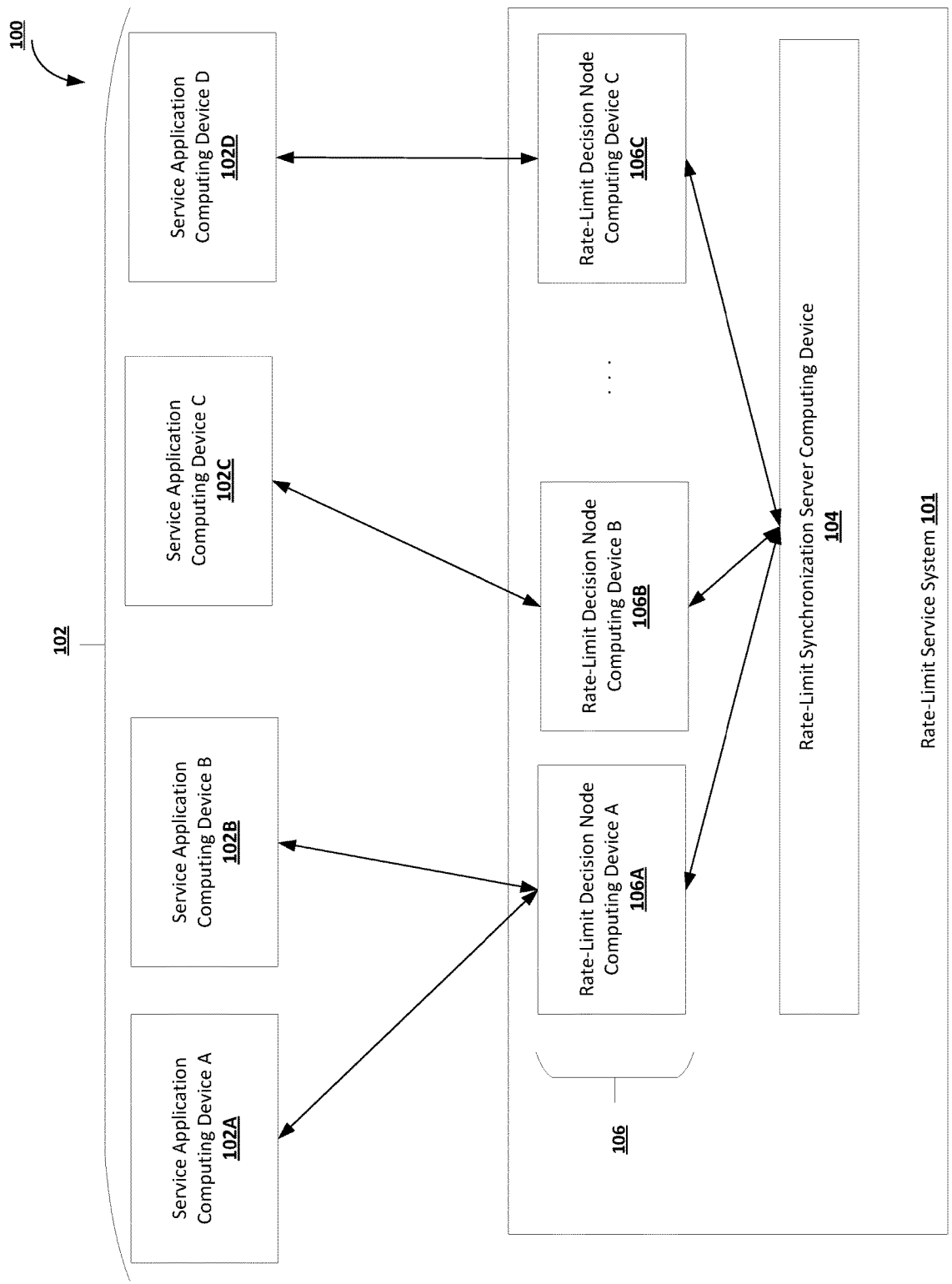
FIG. 1 is a block diagram of an example architecture within which at least some embodiments of the present invention may operate.

FIG. 1 illustrates an example architecture 100 within which embodiments of the present invention may operate. The architecture 100 includes a rate-limit service system 101, which includes a rate-limit synchronization server computing device 104 and one or more rate-limit decision node computing devices 106, as well as one or more service application computing devices 102. The rate-limit service system 101 may be configured to receive rate-limiting requests by the service application computing devices 102, generate a rate-limiting decision for each rate-limiting request, and transmit the rate-limiting decisions to the service application computing devices 102. To do so, the rate-limiting service system utilizes the rate-limit synchronization server computing device 104 and the one or more rate-limit decision node computing devices 106. Aspects of some relevant operations of the rate-limit synchronization server computing device 104, the one or more rate-limit decision node computing devices 106, and the one or more service application computing devices 102 are described in greater detail below with reference to FIGS. 5-11.

In some embodiments, each rate-limit decision node computing device 106 is local to one or more service application computing devices 102 associated with the rate-limit decision node. In some other embodiments, the rate-limit decision node computing devices 106 are remote from the service application computing devices 102. In general, each computing device depicted in the architecture 100 may be local to or remote from any combination of other computing devices depicted in the architecture 100.

In some embodiments, communications between at least some of the pairs of computing devices depicted in FIG. 1 is performed using one or more communication networks. Each communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, each communication network may include a cellular telephone, an 802.11, 802.16, 802.20, and/or WiMax network. Further, each communication network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the rate limiting system. In some embodiments, the protocol is a custom protocol of JavaScript Object Notation (JSON) objects sent via a Websocket channel. In some embodiments, the protocol is JSON over RPC, JSON over REST/HTTP, and the like.

Furthermore, each computing device depicted in FIG. 1 may include one or more storage subsystems. A storage subsystem may include one or more storage units, such as multiple distributed storage units that are connected through a computer network. Each storage unit in the storage subsystem may store at least one of one or more data assets and/or one or more data about the computed properties of one or more data assets. Moreover, each storage unit in the storage subsystem may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Rate-Limit Decision Node Computing Device

Figure 2:
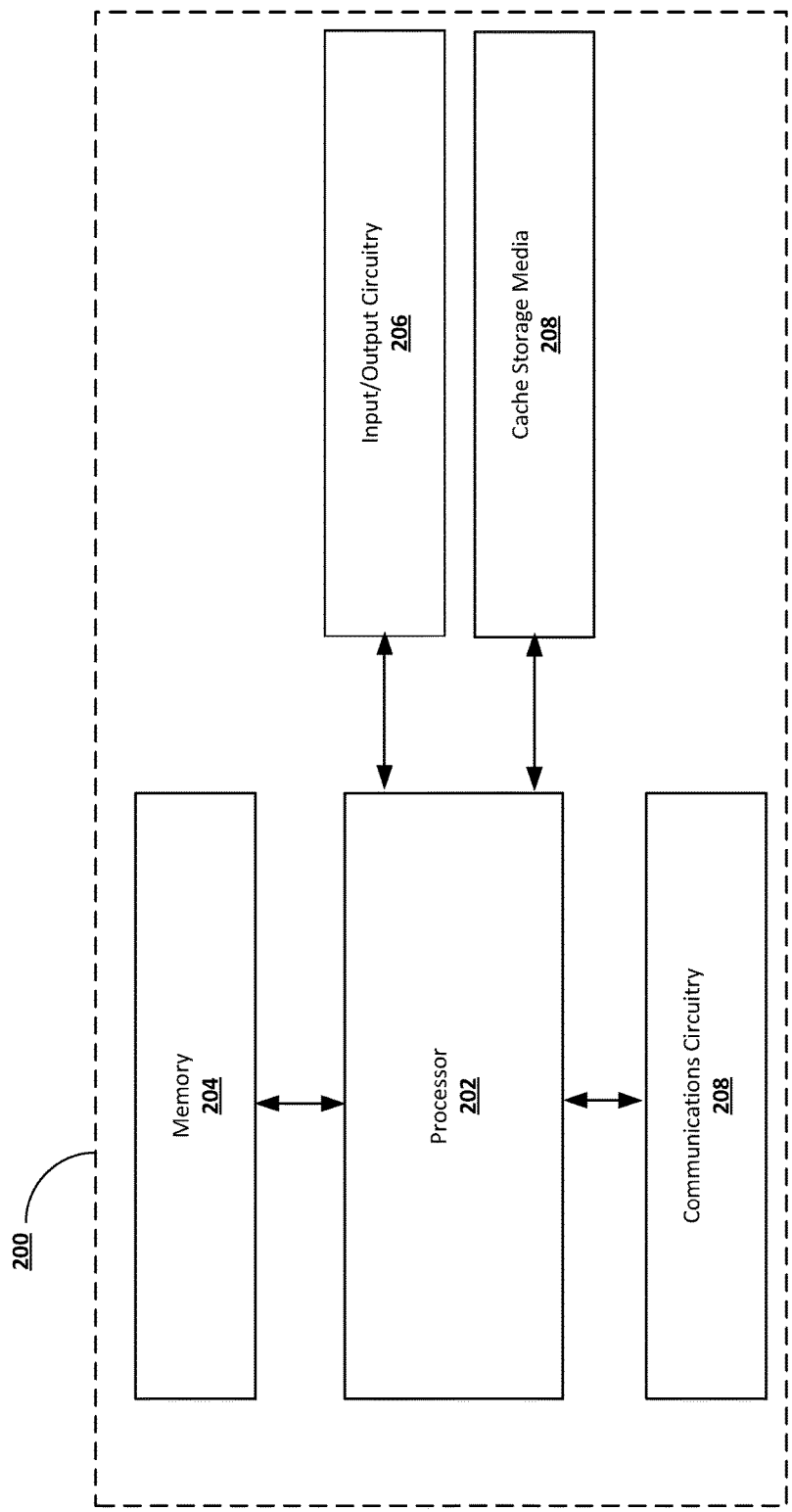
FIG. 2 is a block diagram of an example rate-limit decision node computing device in accordance with at least some embodiments of the present invention.

The rate-limit decision node computing device 106 may be embodied by one or more computing systems, such as apparatus 200 shown in FIG. 2. The apparatus 200 may include processor 202, memory 204, input/output circuitry 206, communications circuitry 208, and cache storage media 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage computing device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing computing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a computing device or circuitry embodied in either hardware or a combination of hardware and software that is configured to receive and/or transmit data from/to a network and/or any other computing device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other computing device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The cache storage media 210 may be configured to store local rate-limiting configuration data stored by the apparatus 200 and to enable faster/more-efficient retrieval of such local rate-limiting configuration data. The cache storage media 210 may have a single-level or multi-level cache storage structure, such as a hierarchical multi-level cache storage structure. Examples of cache storage media 210 that may be utilized by embodiments of the present invention include SRAM caches and DRAM caches.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

B. Exemplary Service Application Computing device

Figure 3:
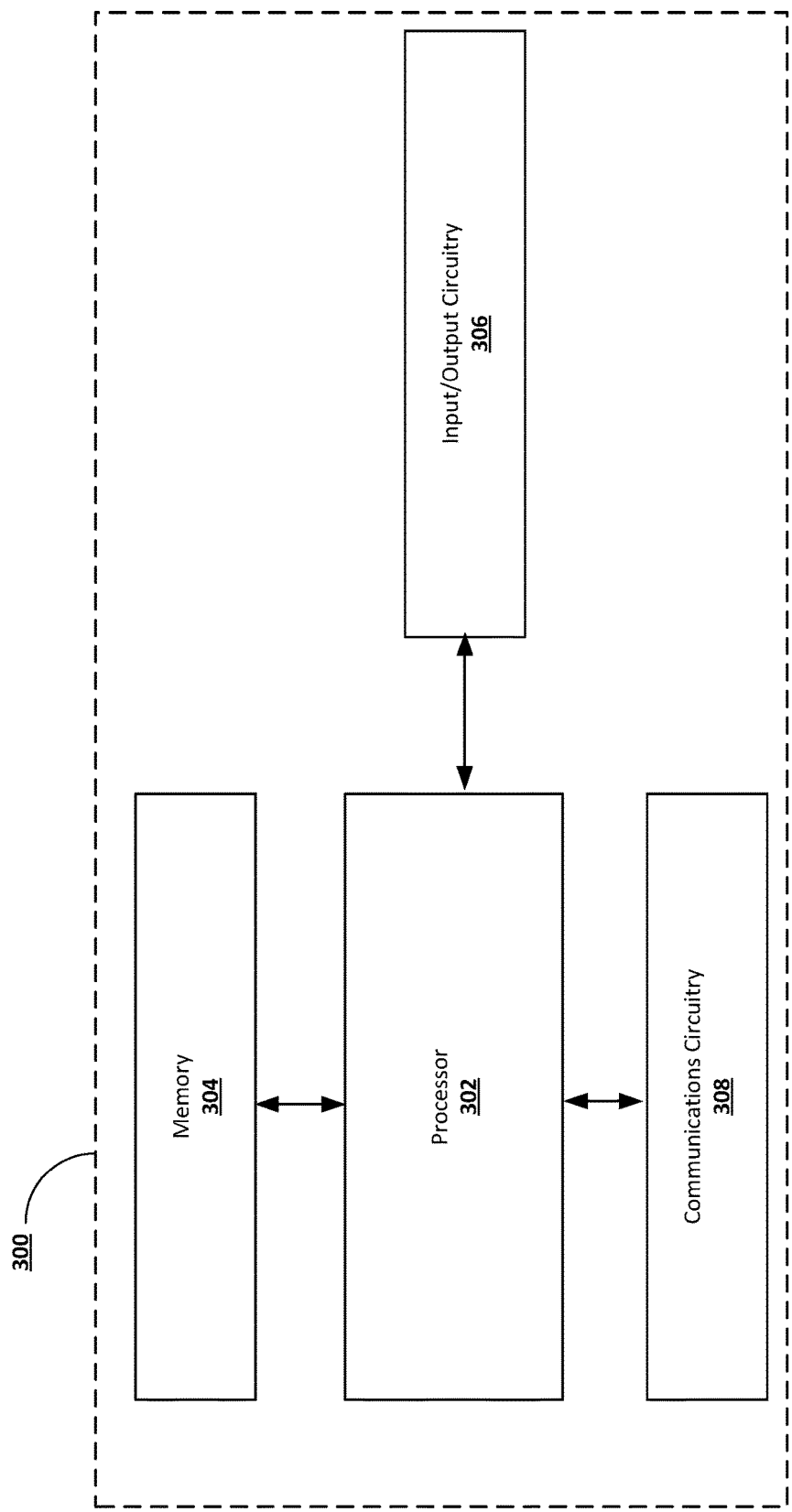
FIG. 3 is a block diagram of an example service application computing device in accordance with at least some embodiments of the present invention.

The service application computing device 102 may be embodied by one or more computing systems, such as apparatus 300 shown in FIG. 3. The apparatus 300 may include processor 302, memory 304, input/output circuitry 306, and communications circuitry 308. The apparatus 300 may be configured to execute the operations described herein. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage computing device (e.g., a computer-readable storage medium). The memory 204 may be configured to store information, data, content, applications, instructions, or the like for enabling the apparatus to carry out various functions in accordance with example embodiments of the present invention.

The processor 302 may be embodied in a number of different ways and may, for example, include one or more processing computing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 308 may be any means such as a computing device or circuitry embodied in either hardware or a combination of hardware and software that is configured to receive and/or transmit data from/to a network and/or any other computing device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other computing device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

C. Exemplary Rate-Limit Synchronization Server Computing device

Figure 4:
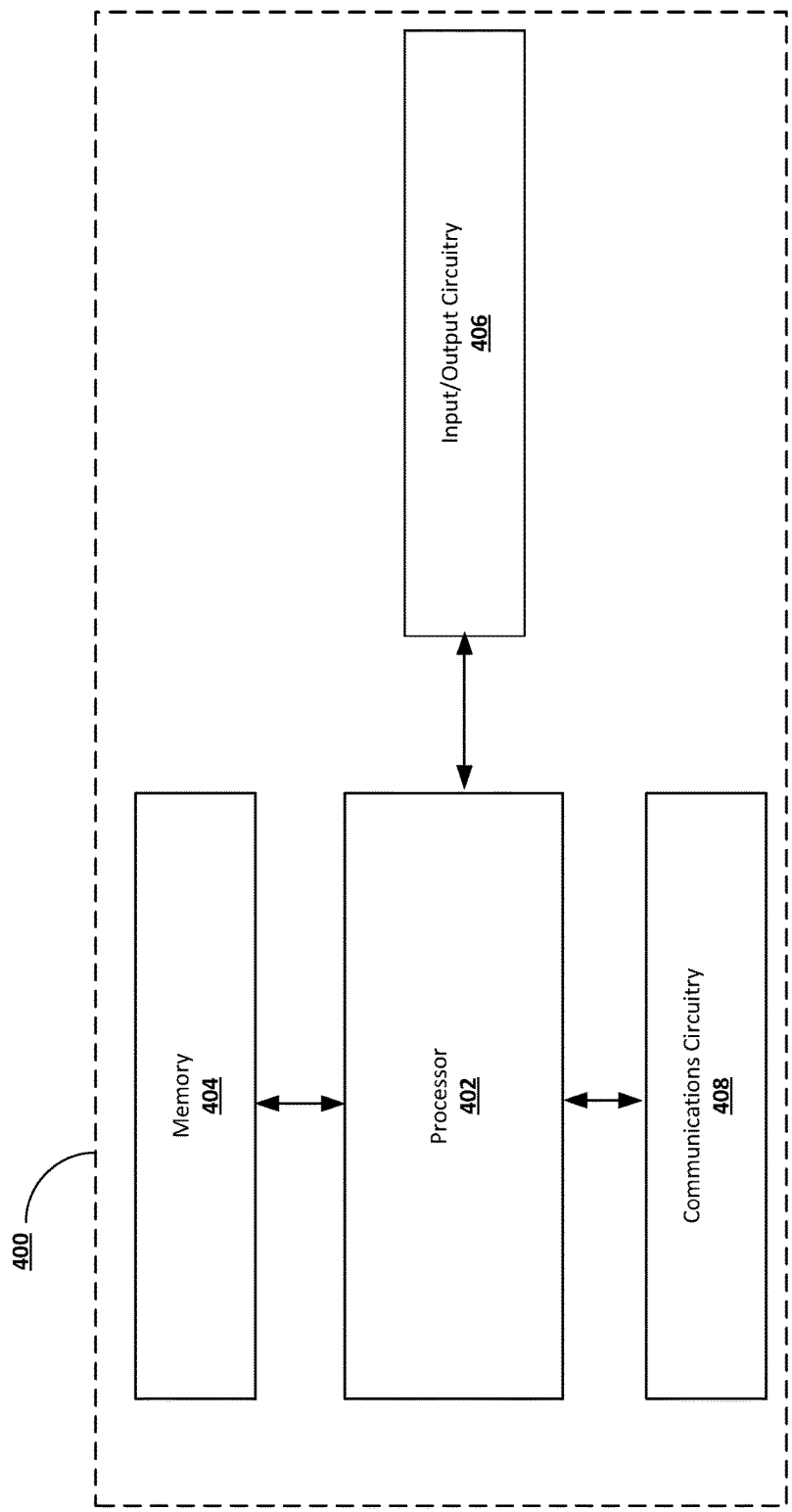
FIG. 4 is a block diagram of an example rate-limit synchronization server computing device in accordance with at least some embodiments of the present invention.

The rate-limit synchronization server computing device 104 may be embodied by one or more computing systems, such as apparatus 400 shown in FIG. 4. The apparatus 400 may include processor 402, memory 404, input/output circuitry 406, and communications circuitry 408. The apparatus 400 may be configured to execute the operations described herein. Although these components 402-408 are described with respect to functional limitations, it should be understood that the particular implementations necessarily include the use of particular hardware. It should also be understood that certain of these components 402-408 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage computing device (e.g., a computer-readable storage medium). The memory 204 may be configured to store information, data, content, applications, instructions, or the like for enabling the apparatus to carry out various functions in accordance with example embodiments of the present invention.

The processor 402 may be embodied in a number of different ways and may, for example, include one or more processing computing devices configured to perform independently. In some preferred and non-limiting embodiments, the processor 402 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 402 may be configured to execute instructions stored in the memory 404 or otherwise accessible to the processor 402. In some preferred and non-limiting embodiments, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present invention while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include input/output circuitry 406 that may, in turn, be in communication with processor 402 to provide output to the user and, in some embodiments, to receive an indication of a user input. The input/output circuitry 406 may comprise a user interface and may include a display, and may comprise a web user interface, a mobile application, a query-initiating computing device, a kiosk, or the like. In some embodiments, the input/output circuitry 406 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 408 may be any means such as a computing device or circuitry embodied in either hardware or a combination of hardware and software that is configured to receive and/or transmit data from/to a network and/or any other computing device, circuitry, or module in communication with the apparatus 400. In this regard, the communications circuitry 408 may include, for example, a network interface for enabling communications with a wired or wireless communication network. For example, the communications circuitry 408 may include one or more network interface cards, antennae, buses, switches, routers, modems, and supporting hardware and/or software, or any other computing device suitable for enabling communications via a network. Additionally or alternatively, the communications circuitry 408 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Example Data Flows and Operations

As described below, various embodiments of the present invention enable techniques for improving efficiency and reliability of rate-limit service systems that utilize at least one of asynchronous rate-limiting, context-aware rate-limiting, and cost-aware rate-limiting. By disclosing those techniques, various embodiments of the present invention make important technical contributions to improving efficiency and reliability of existing rate-limit service systems as well as important technical contributions to the field of network performance optimization studies.

A. Asynchronous Rate-Limiting

Figure 5:
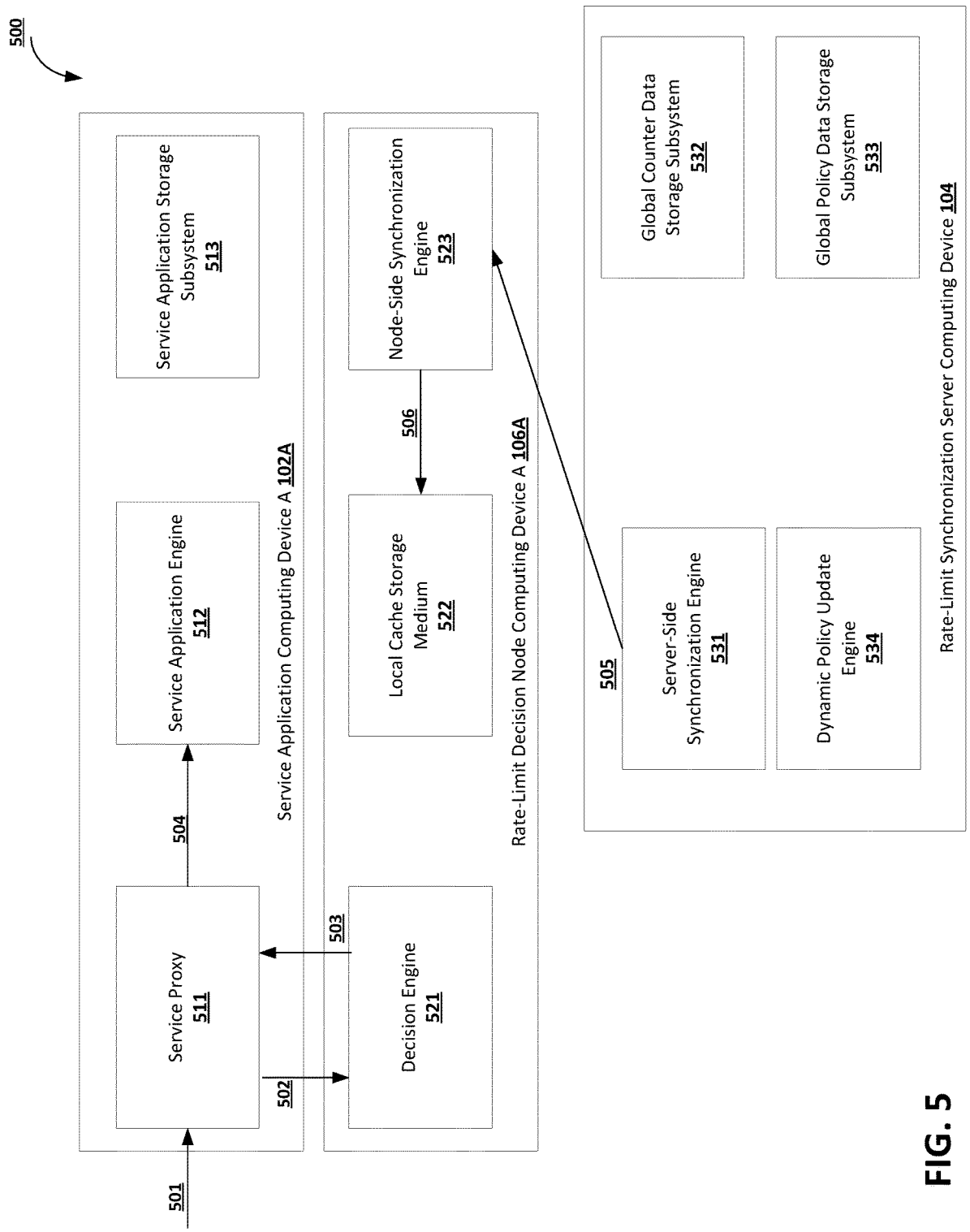
FIG. 5 is a dataflow diagram of an example process for performing asynchronous rate-limiting in accordance with at least some embodiments of the present invention.

FIG. 5 is a dataflow diagram of an example process 500 for performing asynchronous rate-limiting. By performing the operations depicted in FIG. 5, a rate-limit decision node computing device (e.g., the rate-limit decision node computing device A 106A) can increase efficiency of rate-limit decision-making while minimizing synchronization-related drawbacks by temporally decoupling rate-limiting decision-making from rate-limiting configuration data synchronization in order to perform rate-limiting decision-making operations and rate-limiting configuration data synchronization operations asynchronously.

The process 500 begins at operation 501 when a service proxy 511 of a service application computing device (e.g., the service application computing device A 102A) receives a service request. In some embodiments, the service proxy 511 receives the service request from a tenant computing device associated with a tenant identifier. In some embodiments, the service request is an HTTP packet that includes at least one of the following in the header of the HTTP packet and/or in the payload of the HTTP packet: (i) the tenant descriptor that describes the tenant identifier, (ii) a user descriptor that describes a user identifier associated with the tenant identifier which is deemed the originator user profile of the service request, (iii) an Internet Protocol (IP) address of a client computing device and/or a client system that is deemed the originator computing device of the service request, (iv) a regional identifier for the originator computing device, (v) a query descriptor describing a type of the service request, and (vi) a parameter describing one or more parameters of the service request. An example of a service application is Confluence, while an example of a tenant identifier associated with the noted service application is a tenant identifier associated with the Delta Corporation.

The service request may seek to perform at least one of the following operations: (i) cause a service application engine 512 of the service application computing device A 102A to perform one or more data retrieval actions with respect to the data stored in a service application storage subsystem 513 of the service application computing device A 102A, and (ii) cause a service application engine 512 of the service application computing device A 102A to perform one or more data modification actions with respect to the data stored in the service application storage subsystem 513. For example, the Confluence service application may be configured to retrieve digital documents and/or modify digital documents in response to user requests by user profiles associated with tenant identifiers (e.g., with Delta Corporation). While various embodiments of the present invention describe the service application storage subsystem of a service application engine of a service application computing device as being a local service application storage subsystem, a person of ordinary skill in the relevant technology will recognize that the service application storage subsystem may be a remote storage subsystem, such as a collection of one or more cloud storage units.

Although various embodiments of the present invention describe the service application computing device A 102A as having a single service proxy for communication with other computing devices (e.g., with the tenant computing devices and/or with the rate-limit decision nodes), a person of ordinary skill in the relevant technology will recognize that the service application computing device A 102A may have any number of service proxies. Furthermore, a person of ordinary skill in the relevant technology will recognize that the service application computing device A 102A may utilize one or more other communication engines (e.g., one or more API gateways) instead of or in addition to the service proxies to enable communicating with other computing devices (e.g., with the tenant computing devices and/or with the rate-limit decision nodes). Moreover, a person of ordinary skill in the relevant technology will recognize that the service application engine 512 may directly communicate with other computing devices (e.g., with the tenant computing devices and/or with the rate-limit decision nodes).

At operation 502, the service proxy 511 transmits a rate-limiting request associated with the service request to a decision engine 521 of the rate-limit decision node computing device A 106A. The rate-limiting request may be an HTTP packet (e.g., a JSON-based HTTP packet) or a general-purpose Remote Procedure Call (gRPC). The rate-limiting request may include data fields that can be used to extract policy-defining features from the rate-limiting request. For example, policy-defining features may be integrated as part of the header of the rate-limiting request, as part of a request path of the rate-limiting request that describes a target path of the service request in relation to the structure of the data stored in the service application storage subsystem 513, as query parameters of the rate-limiting request, as a tenant descriptor field of the rate-limiting request which is determined based on the tenant descriptor of the service request, as a user descriptor field of the rate-limiting request which is determined based on the user descriptor of the service request, and/or the like.

Figure 6:
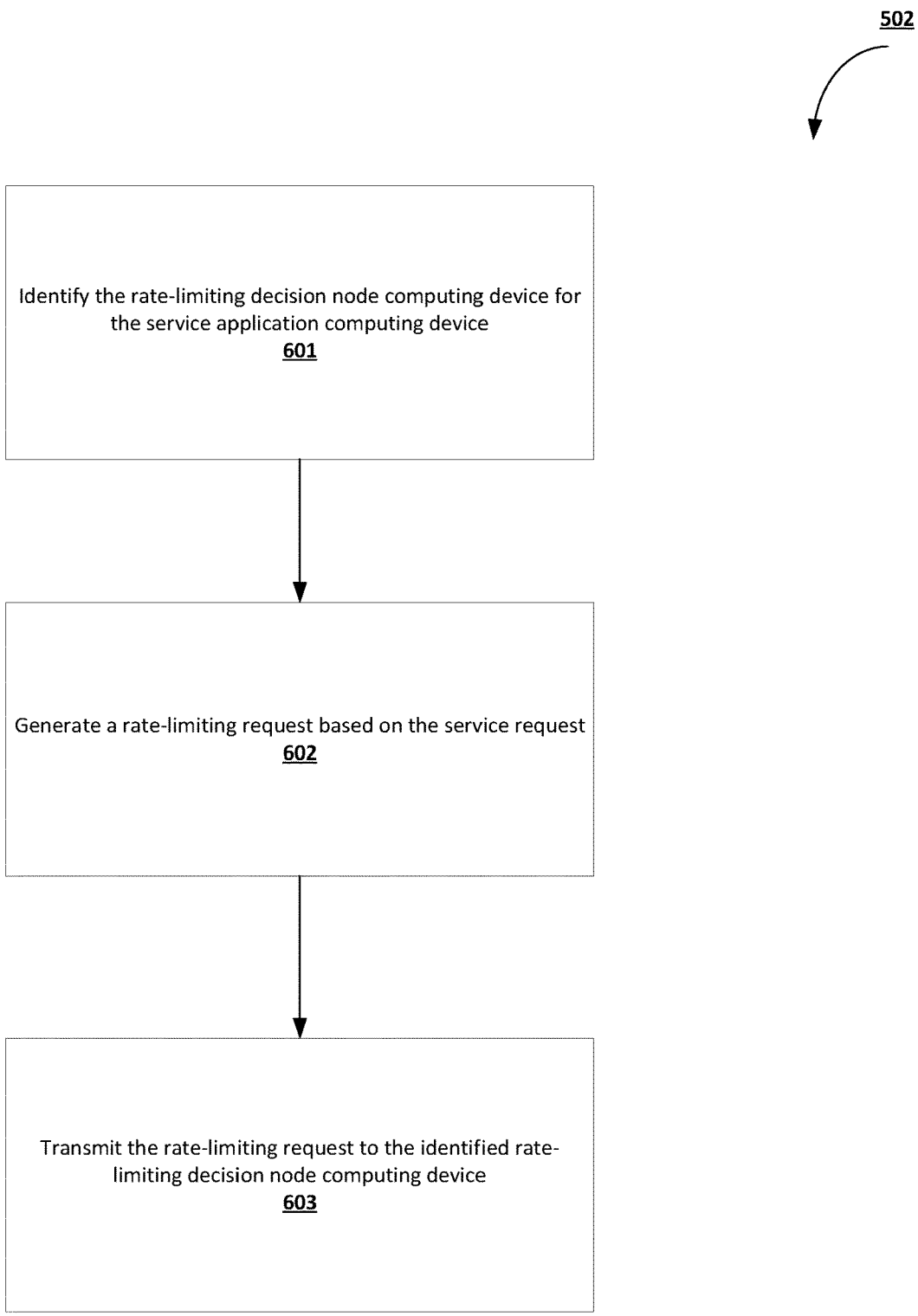
FIG. 6 is a flowchart diagram of an example process for transmitting a rate-limiting request in accordance with at least some embodiments of the present invention.

In some embodiments, operation 502 can be performed in accordance with the operations of the process depicted in FIG. 6. The process depicted in FIG. 6 begins at operation 601 when the service proxy 511 identifies the rate-limit decision node computing device A 106A as the rate-limit decision node computing device for the rate-limiting request. In some embodiments, each service application is associated with a respective rate-limit decision node computing device, and thus identifying the rate-limit decision node computing device for the rate-limiting request comprises identifying the rate-limit decision node computing device that is associated with the service application computing device A 102A, which in this case is the rate-limit decision node computing device 106A. In some embodiments, each rate-limit decision node computing device is associated with a geographic region and/or a sub-network of a communication network that connects service applications to tenant computing devices. In some of the noted embodiments, identifying the rate-limit decision node computing device for the service request includes identifying the geographic region and/or the sub-network that is associated with the originating computing device that is associated with the rate-limiting request followed by identifying the rate-limit decision node computing device that is associated with the identified geographic region and/or the identified sub-network.

At operation 602, the service proxy 511 generates the rate-limiting request based on the service request. In some embodiments, to generate the rate-limiting request, the service proxy 511 detects policy-defining features based on the service request and integrates the policy-defining features into the rate-limiting request. For example, the service proxy 511 may integrate the policy-defining features as part of the request path of the rate-limiting request, as part of the header fields of the rate-limiting request, as part of the query parameters of the rate-limiting request, as part of a tenant descriptor of the rate-limiting request, and/or as part of a user descriptor of the rate-limiting request. In some embodiments, the policy-defining features are configured to enable the rate-limiting node computing devices to perform context-aware rate-limiting. Aspects of the context-aware rate-limiting features of the present invention are described in Subsection B of the present section. In some embodiments, the rate-limiting request and the service request include the same communication packet, and thus generating the rate-limiting request by the service proxy 511 includes forwarding the service request identified at operation 601 to the rate-limit decision node computing device A 106A identified at operation 601.

At operation 603, the service proxy 511 transmits the rate-limiting request to the identified rate-limit decision node computing device A 106A, in particular to the decision engine 521 of the rate-limit decision node computing device. As noted above, the rate-limiting request may be an HTTP packet and/or a gRPC packet that is transmitted over a communication network (e.g., a local area network and/or a wide area network) to the rate-limit decision node computing device A 106A. While various embodiments of the present invention describe service application computing devices as being remote from rate-limit decision node computing devices, a person of ordinary skill in the relevant technology will recognize that the service application computing devices may in some implementations of the present invention be local to rate-limit decision node computing devices.

Returning to FIG. 5, at operation 503, the decision engine 521 transmits a rate-limiting decision for the rate-limiting request to the service proxy 511. In some embodiments, to generate the rate-limiting decision, the decision engine 521 utilizes rate-limiting configuration data stored in the local cache storage medium 522 of the rate-limit decision node computing device A 106A to determine local rate-limiting policies that apply to the rate-limiting decision and subsequently determines whether the policy-defining features of the rate-limiting decision satisfy the determined applicable local rate-limiting policies.

Figure 7:
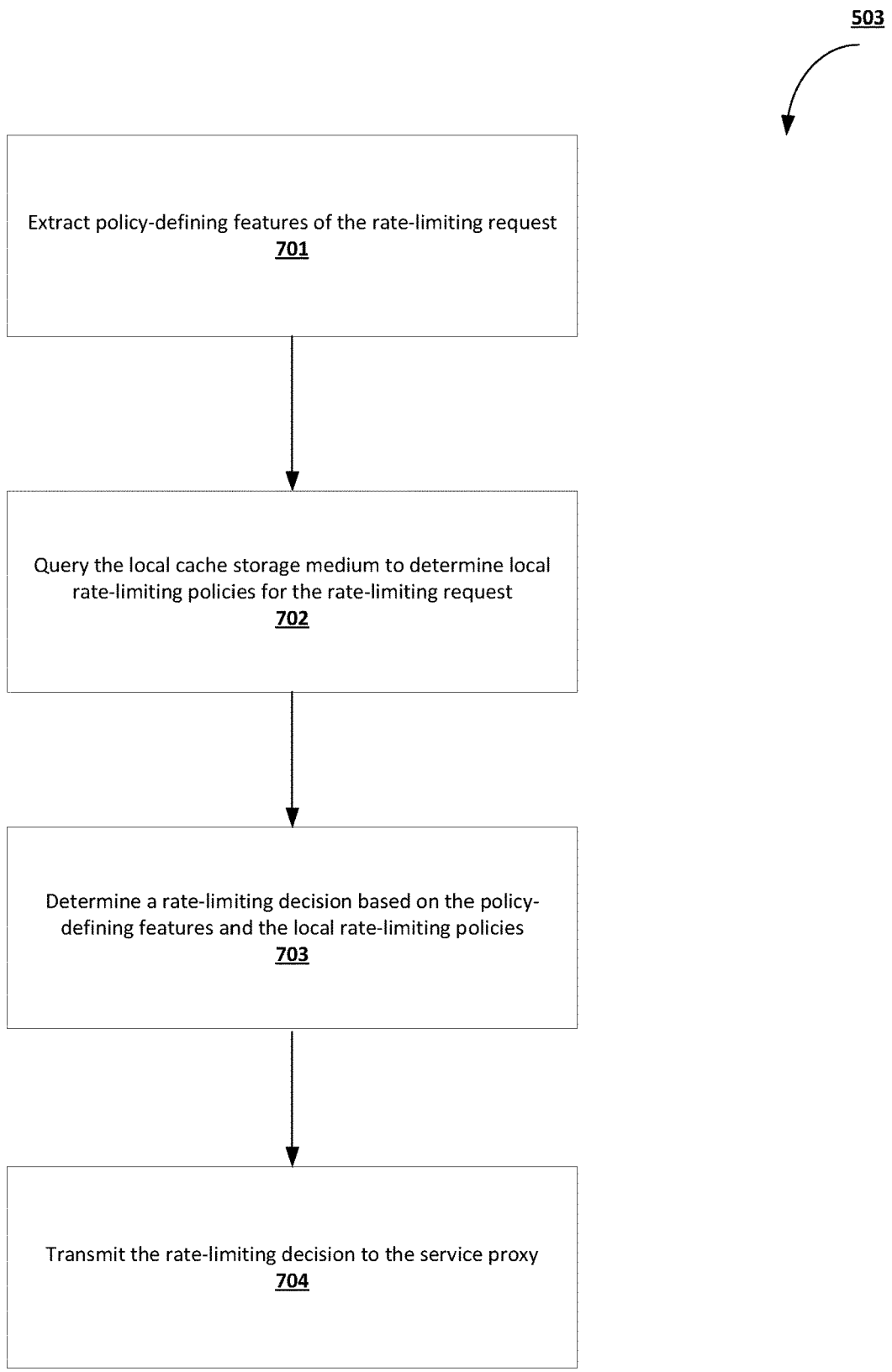
FIG. 7 is a flowchart diagram of an example process for transmitting a rate-limiting decision in accordance with at least some embodiments of the present invention.

In some embodiments, operation 503 may be performed in accordance with the process depicted in FIG. 7. The process depicted in FIG. 7 begins at operation 701 when the decision engine 521 extracts policy-defining features of the rate-limiting request. In some embodiments, the policy-defining features include at least one of the following: one or more tenant-related features that describe properties of the tenant identifier associated with the rate-limiting request, one or more user-related features that describe properties of the user identifier associated with the rate-limiting request, and one or more request-related features that describe properties of the data access operations requested by the service request that is associated with the rate-limiting request. Aspects of policy-defining features are described in greater detail below with reference to Subsection B of the present section, which describes some implementations of the context-aware rate-limiting aspects of the present invention.

At operation 702, the decision engine 521 queries the local cache storage medium 522 to determine local rate-limiting policies that are associated with the rate-limiting request. In some embodiments, to determine the local rate-limiting policies that are associated with the rate-limiting request, the decision engine 521 selects local rate-limiting policies that are associated with the service application computing device A 102A and that correspond to the policy-defining features of the rate-limiting request. In some embodiments, at least a portion of the policy-defining features of a rate-limiting request can be used to select the local rate-limiting policies for the rate-limiting request.

For example, if the local rate-limiting configuration data stored in the local cache storage medium 522 define a particular local rate-limiting policy for all rate-limiting requests associated with a particular tenant identifier, then the policy-defining features that describe the particular tenant identifier may be used to select the particular local rate-limiting policy for an incoming rate-limiting request that is associated with the particular tenant identifier. As another example, if the local rate-limiting configuration data stored in the local cache storage medium 522 define a particular local rate-limiting policy for all rate-limiting requests associated with a group of user identifiers of a particular tenant identifier, then the policy-defining features that describe the particular tenant identifier and the policy-defining features that describe user-defining features of the user identifiers in the noted group may be used to select the particular local rate-limiting policy for an incoming rate-limiting request that is associated with the particular tenant identifier and with a user identifier in the noted group of user identifiers. As yet another example, if the local rate-limiting configuration data stored in the local cache storage medium 522 define a particular local rate-limiting policy for all rate-limiting requests associated with a particular tenant identifier that have been received during a particular time interval, then the policy-defining features that describe the particular tenant identifier and the policy-defining features that describe receipt timestamps of the rate-limiting requests associated with the particular time interval to select the particular local rate-limiting policy for an incoming rate-limiting request that is associated with the particular tenant identifier and has a receipt timestamp that is in the particular time interval.

At operation 703, the decision engine 521 determines a rate-limiting decision for the rate-limiting request based on the one or more policy-defining parameters and the one or more local rate-limiting policies. In some embodiments, to determine the rate-limiting request for the rate-limiting request based on the one or more policy-defining parameters and the one or more local rate-limiting policies, the decision engine 521 determines a per-policy rate-limiting determination for the rate-limiting request with respect to each local rate-limiting policy of the one or more local rate-limiting policies and determines the rate-limiting decision based on each per-policy rate-limiting determination that is associated with a local rate-limiting policy of the one or more local rate-limiting policies.

For example, the decision engine 521 may determine an affirmative rate-limiting decision for the rate-limiting request if all of the per-policy rate-limiting determinations are affirmative rate-limiting determinations. As another example, the decision engine 521 may determine an affirmative rate-limiting decision for the rate-limiting request if a threshold number of the per-policy rate-limiting determinations are affirmative rate-limiting determinations. As yet another example, the decision engine 521 may determine an affirmative rate-limiting decision for the rate-limiting request if a threshold ratio of the per-policy rate-limiting determinations are affirmative rate-limiting determinations. As a further example, the decision engine 521 may determine an affirmative rate-limiting decision for the rate-limiting request by providing the per-policy rate-limiting determinations to a trained per-policy rate-limiting determination aggregation model (e.g., a trained per-policy rate-limiting determination aggregation neural network model) that is configured to determine the rate-limiting decision based on the noted per-policy rate-limiting determinations.

In some embodiments, to determine a per-policy rate-limiting determination for the rate-limiting request with respect to a local rate-limiting policy, the decision engine 521 determines a related subset of the policy-defining parameters that relate to the local rate-limiting policy, queries the local cache storage medium 522 based on the related subset to obtain a local rate-limiting counter for the rate-limiting request with respect to the local rate-limiting policy, and determines the per-policy rate-limiting determination for the local rate-limiting policy based on the local rate-limiting counter and the local rate-limiting policy. In some of the noted embodiments, to determine the per-policy rate-limiting determination for the local rate-limiting policy based on the local rate-limiting counter and the local rate-limiting policy, the decision engine 521 determines whether the local rate-limiting counter satisfies the rate-limiting policy. In some of the noted embodiments, in response to determining that the local rate-limiting counter satisfies the rate-limiting policy, the decision engine 521 determines an affirmative per-policy rate-limiting determination for the local rate-limiting policy; however, in response to determining that the local rate-limiting counter fails to satisfy the rate-limiting policy, the decision engine 521 determines a negative per-policy rate-limiting determination for the local rate-limiting policy.

At operation 704, the decision engine 521 transmits the rate-limiting decision to the service proxy 511. In some embodiments, the decision engine 521 generates a communication packet (e.g., an HTTP communication packet and/or a gRPC communication packet) that describes the rate-limiting decision in a designated field of the header and/or a designated field of the payload of the communication packet and transmits the generated communication packet to the service proxy 511. In some embodiments, the decision engine 521 transmits a first type of communication packet to describe that the rate-limiting decision is an affirmative rate-limiting decision and transmits a second type of communication packet to describe that the rate-limiting decision is a negative rate-limiting decision. In some embodiments, the decision engine 521 transmits an HTTP communication packet with a first type of HTTP code (e.g., with a 200 HTTP code) to describe that the rate-limiting decision is an affirmative rate-limiting decision and transmits an HTTP communication packet with a second type of HTTP code (e.g., with a 429 HTTP code) to describe that the rate-limiting decision is a negative rate-limiting decision.

Returning to FIG. 5, at operation 504, the service proxy 511 communicates with the service application engine 512 to either enable the data access operations requested by the service request or deny the data access operations requested by the service request based at least in part on the rate-limiting decision obtained from the decision engine 521. In some embodiments, the service proxy 511 is configured to enable the data access operations requested by the service request in response to determining that the rate-limiting decision is an affirmative decision engine, and to deny the data access operations requested by the service request in response to determining that the rate-limiting decision is a negative decision engine. In some embodiments, the rate-limiting decision is deemed by the service proxy 511 as a mere recommendation about whether to enable or deny the data access operations requested by the service request, and service proxy 511 may determine whether to enable the data access operations requested by the service request or deny the data access operations requested by the service request based on run-time configuration settings in addition to the rate-limiting decision communicated to the service proxy 511 by the decision engine 521.

At operation 505, a server-side synchronization engine 531 of the rate-limit synchronization server computing device 104 transmits one or more asynchronous configuration data updates to node-side synchronization engines of the rate-limit decision node computing devices associated with the rate-limit synchronization server computing device 104, such as the node-side synchronization engine 523 of the rate-limit decision node computing device A 106A. The asynchronous configuration data updates are configured to update rate-limiting configuration data maintained by each the rate-limit decision node computing device associated with the rate-limit synchronization server computing device 104 in the local cache storage medium of the rate-limit decision node computing device, for example by the rate-limit decision node computing device A 106A in the local cache storage medium 522 of the rate-limit decision node computing device A 106A. Examples of asynchronous configuration data updates are asynchronous policy data updates and asynchronous counter data updates. An asynchronous policy data update refers to an asynchronous configuration data update that describes any changes to a global rate-limiting policy, while an asynchronous counter data update refers to an asynchronous configuration data update that describes any changes to a global rate-limiting counter.

Figure 8:
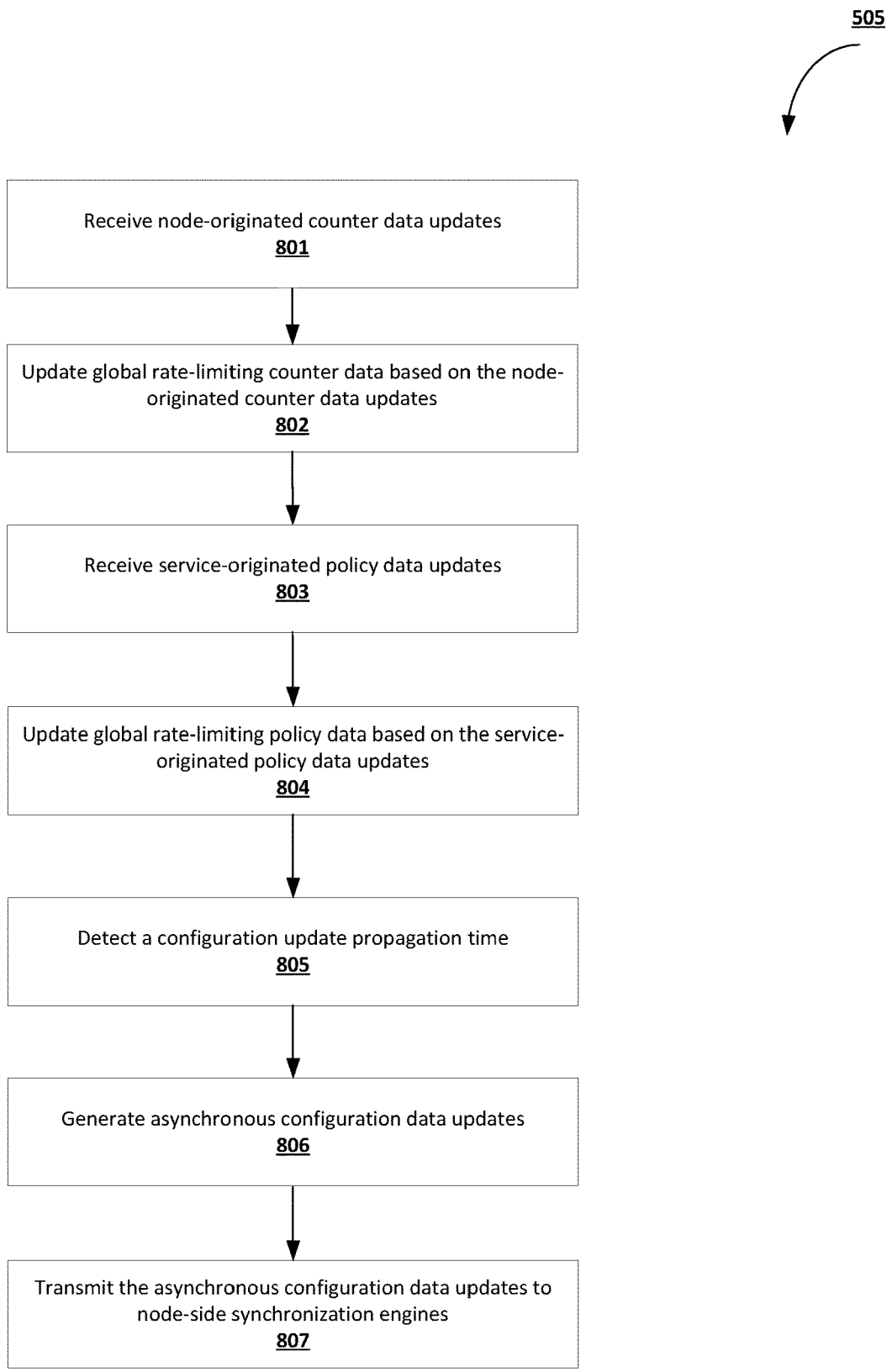
FIG. 8 is a flowchart diagram of an example process for transmitting asynchronous configuration data updates in accordance with at least some embodiments of the present invention.

In some embodiments, operation 505 can be performed in accordance with the operations of the process depicted in FIG. 8. The process depicted in FIG. 8 begins at operation 801 when the server-side synchronization engine 531 receives node-originated counter data updates from the rate-limit decision nodes associated with the server-side synchronization engine 531. In some embodiments, upon determining an affirmative rate-limiting decision for a rate-limiting request by the decision engine of a rate-limit decision node computing device, the node-side synchronization engine of a rate-limit decision node computing device is configured to generate a node-originated counter data update and transmit the node-originated counter data update to the server-side synchronization engine 531. For example, in response to determining an affirmative rate-limiting decision at operation 503, the node-side synchronization engine 523 may transmit a corresponding node-originated counter data update to the server-side synchronization engine 531.

To transmit a corresponding node-originated counter data update to the server-side synchronization engine 531 in response to determining an affirmative rate-limiting decision at operation 503, the node-side synchronization engine 523 may be configured to: (i) update any local rate-limiting counter associated with the rate-limiting request (i.e., any local rate-limiting counter used to determine the rate-limiting decision for the rate-limiting request) based on a counter update measure, (ii) record the pre-update value of each local rate-limiting counter associated with the rate-limiting request as a synchronized local rate-limiting counter for the local rate-limiting counter, (iii) generate a node-originated counter data update that describes each local rate-limiting counter associated with the rate-limiting request along with the synchronized local rate-limiting counter for the local rate-limiting counter, and (iv) transmit the node-originated counter data update to the server-side synchronization engine 531. The server-side synchronization engine 531 is in turn configured to update the global rate-limiting counter data stored in the global counter data storage subsystem 532 based on the node-originated counter data update received from the node-side synchronization engine 523.

As an example, upon determining an affirmative rate-limiting decision for a rate-limiting decision that is associated with three local rate-limiting counters having the pre-update values 0.1, 2.5, and 3.1, the node-side synchronization engine 523 may update the three noted local rate-limiting counters with counter update measures a, b, and c respectively. Therefore, the node-originated counter data update transmitted by the node-side synchronization engine 523 may describe the following values: {0.1, 0.1+a, 2.5, 2.5+b, 3.1, 3.1+c}. The counter update measures may be determined based on predefined values, based on runtime-generated values, and/or based on one or more trained machine learning models. In some embodiments, the counter update measures are determined based on an estimated resource cost of the rate-limiting request for the service application. Aspects of updating local rate-limiting counters based on estimated resource costs are described in Subsection C of the present section, which describes some implementations of the cost-based rate-limiting aspects of the present invention.

An operational example of a node-originated counter data update payload 900 is depicted in FIG. 9. As depicted in FIG. 9, the node-originated counter data update payload 900 includes an array 901 that describes, for each local rate-limiting counter that has been updated since a last synchronization of local rate-limiting configuration data, an identifier 902 of the local rate-limiting counter, the updated value 903 of the local rate-limiting counter, the pre-update value 904 of the synchronized local rate-limiting counter that is associated with the local rate-limiting counter, the timestamp 905 associated with the asynchronous configuration data update transmitted to the corresponding rate-limit decision node computing device by the rate-limit synchronization server computing device 104 that led to recording the pre-update value 904 of the synchronized local rate-limiting counter that is associated with the local rate-limiting counter (i.e., the timestamp of the latest synchronization of the local rate-limiting counter), and the timestamp 906 associated with updating the value of the local rate-limiting counter (i.e., the timestamp of the latest local modification of the local rate-limiting counter).

Returning to FIG. 8, at operation 802, the server-side synchronization engine 531 updates global rate-limiting counter data maintained in the global counter data storage subsystem 532 of the rate-limit synchronization server computing device 104 based on node-originated counter data updates received from the rate-limit decision node computing devices. To do so, the server-side synchronization engine 531 may perform the following operations: (i) determine whether the synchronized local rate-limiting counter described by the node-originated counter date update exceeds the local rate-limiting counter described by the node-originated counter date update; (ii) in response to determining that the synchronized local rate-limiting counter exceeds the local rate-limiting counter, update a global rate-limiting counter for the rate-limiting request with respect to the rate-limiting policy based on the local rate-limiting counter; and (iii) in response to determining that the synchronized local rate-limiting counter fails to exceed the local rate-limiting counter, update the global rate-limiting counter for the rate-limiting request with respect to the rate-limiting policy based on a measure of deviation of the local rate-limiting counter and the synchronized local rate-limiting counter.

The global counter data storage subsystem 532 may be a data storage subsystem that is architecturally configured to enable more frequent retrieval of data and/or more frequent modification of data. The reason for this consideration is that global rate-limiting counter data will likely change very frequently (i.e., in response to each affirmative rate-limiting decision, which may occur very frequently during the course of the operation of a service application). Accordingly, in some embodiments, global counter data storage subsystem 532 includes a main memory storage medium, and the global rate-limiting counter data is stored on the noted main memory. Moreover, in some embodiments, the global rate-limiting counter data is stored as a collection of key-value pairs. In some embodiments, the global rate-limiting counter data is stored using the Redis data storage framework.

At operation 803, the server-side synchronization engine 531 receives service-originated rate-limiting policy updates from the service application computing devices associated with the rate-limit synchronization server computing device 104 and/or from computing devices associated with administrator user profiles of the noted service application computing devices. The service-originated rate-limiting policy updates may seek to modify rate-limiting policies associated with the service applications. Modifying a rate-limiting policy may include changing the ranges of policy-defining features whose satisfaction causes the rate-limiting policy to be deemed applicable to a rate-limiting request. Aspects of this functionality, referred to in this document sometimes as changing the context of a rate-limiting policy, is described in Subsection B of the present section, which describes some implementations of the context-aware rate-limiting aspects of the present invention.

For example, in some embodiments, a service-originated rate-limiting policy update may seek to perform at least one of the following with respect to each rate-limiting policy of one or more designated rate-limiting policies: (i) delete (i.e., disable) the rate-limiting policy, (ii) modify a rate-limit threshold value of the rate-limiting policy (e.g., from two approvable requests per five minutes to three approvable requests per five minutes), (iii) modify a rate-limit threshold measurement unit of the rate-limit threshold value of the rate-limiting policy (e.g., from minutes to seconds), (iv) modify a rate-limiting technique descriptor of the rate-limiting policy (e.g., from fixed window rate-limiting to sliding window rate-limiting, from sliding log rate-limiting to leaky bucket rate-limiting, from leaky-bucket rate-limiting to token bucket rate limiting, and/or the like), (iv) modify a fail mode descriptor of the rate-limiting (e.g., from requiring that all data access requests that correspond to the rate-limiting policy should be allowed in the event of lack of synchronization of a local rate-limiting policy for the rate-limiting policy by the rate-limit synchronization server computing device 104 for a predefined period of time to requiring that all data access requests that correspond to the rate-limiting policy should be denied in the event of lack of synchronization of a local rate-limiting policy for the rate-limiting policy by the rate-limit synchronization server computing device 104 for the predefined period of time), (v) modify qualifying criteria for the rate-limiting policy (e.g., add a policy-defining parameter value range whose satisfaction by a rate-limiting request is required to cause the rate-limiting policy to be deemed applicable to the rate-limiting request, modify at least one of the policy-defining parameter value ranges whose satisfaction by a rate-limiting request is required to cause the rate-limiting policy to be deemed applicable to the rate-limiting request, delete add a policy-defining parameter value range whose satisfaction by a rate-limiting request is required to cause the rate-limiting policy to be deemed applicable to the rate-limiting request, and/or the like), and (vi) modify a geographic region and/or a network region to which the rate-limiting policy applies.

At operation 804, the server-side synchronization engine 531 updates global rate-limiting policy data stored in the global policy data storage subsystem 533 of the rate-limit synchronization server computing device 104 based on the service-originated policy data update received from the node-side synchronization engine 523. To do so, the server-side synchronization engine 531 may be configured to, for each rate-limiting policy affected by the service-originated policy data update, identify a target data field and/or a target data object of the global rate-limiting policy data that corresponds to the rate-limiting policy and modify the target data field and/or the target data object based on the rate-limiting policy.

The global policy data storage subsystem 533 may be a data storage subsystem that is architecturally configured to enable less frequent retrieval of data and/or less frequent modification of data. The reason for this consideration is that global rate-limiting counter data will likely change less frequently than the global rate-limiting policy data. Accordingly, in some embodiments, global policy data storage subsystem 533 includes a hard disk storage medium and/or other permeant storage medium, and the global rate-limiting counter data is stored on the hard disk and/or on the other permeant storage medium. Moreover, in some embodiments, the global rate-limiting policy data is stored as a collection of one or more relational database tables. In some embodiments, the global rate-limiting policy data is stored using the DynamoDB data storage framework.

At operation 805, the server-side synchronization engine 531 detects a configuration data update propagation time. For example, the server-side synchronization engine 531 may detect a configuration data update propagation time based on detecting changes to at least one of the global rate-limiting counter data stored in the global counter data storage subsystem 532 and the global rate-limiting policy data stored in the global policy data storage subsystem 533. In some embodiments, the configuration data update propagation time is a counter data update propagation time.

At operation 806, in response to detecting the configuration data update propagation time, the server-side synchronization engine 531 generates, for each rate-limit decision node computing device associated with the rate-limit synchronization server computing device 104, an asynchronous configuration data update that describes one or more changes made to the global rate-limiting configuration data (i.e., any changes to at least one of the global rate-limiting counter data and the global rate-limiting policy data) from the time of transmission of an immediately precedent asynchronous configuration data update. In some embodiments, when the configuration data update propagation time is a counter data update propagation time, the asynchronous configuration data updates may be guaranteed to include counter data updates but may optionally include or not include policy data updates.

In some embodiments, the policy data updates selected to be included in an asynchronous configuration data update that is transmitted to a particular rate-limit decision node computing device may exclude asynchronous configuration data updates (e.g., asynchronous policy data updates) that are not applicable to a geographic region and/or a subnetwork covered by the particular rate-limit decision node computing device. In some embodiments, all changes to the global rate-limiting configuration data are reported to all rate-limit decision node computing devices associated with the rate-limit synchronization server computing device 104, regardless of whether the changes apply to a geographic region and/or to a subnetwork of the recipient rate-limit decision node computing devices.

An operational example of an asynchronous configuration data update payload 1000 of an asynchronous configuration data update that may be transmitted to a rate-limit decision node computing device, such as the rate-limit decision node computing device A 102, is depicted in FIG. 10. As depicted in FIG. 10, the asynchronous configuration data update payload 1000 includes a counter array 1001 that includes, for each updated rate-limiting counter, a counter identifier 1011 of the updated rate-limiting counter, an updated value 1012 of the updated rate-limiting counter, and update time 1003 of the updated rate-limiting counter. As further depicted in FIG. 10, 10, the asynchronous configuration data update payload 1000 optionally includes a policy array 1002 that includes, for each updated rate-limiting policy, updated qualifying criteria features 1021 of the updated rate-limiting policy, updated qualifying criteria threshold values 1022 of the updated rate-limiting counter, updated qualifying criteria threshold measurement units 1023 of the updated rate-limiting counter, and updated rate-limiting techniques 1024 of the updated rate-limiting counter.

Returning to FIG. 8, at operation 807, the server-side synchronization engine 531 transmits the asynchronous configuration data update associated with each rate-limit decision node computing device to the node-side synchronization engine of the noted rate-limit decision node computing device. In some embodiments, the server-side synchronization engine 531 transmits the asynchronous configuration data update associated with each rate-limit decision node computing device to the node-side synchronization engine of the noted rate-limit decision node computing device as part of a communication packet (e.g., an HTTP packet, a gRPC packet, and/or the like) that includes the asynchronous configuration data update associated with the rate-limit decision node computing device as designated fields of the header of the communication packet and/or as designated fields of the payload of the communication packet.

Returning to FIG. 5, at operation 506, each node-side synchronization engine of a rate-limit decision node computing device updates the local rate-limiting configuration data maintained in the local cache storage medium of the rate-limit decision node computing device based on the asynchronous configuration data update for the rate-limit decision node computing device that is received from the server-side synchronization engine 531 of the rate-limit synchronization server computing device 104. For example, the node-side synchronization engine 523 of the rate-limit decision node computing device A 106A may update the local rate-limiting configuration data maintained in the local cache storage medium 522 of the rate-limit decision node computing device A 106A based on the asynchronous configuration data update for the rate-limit decision node computing device A 106A that is received from the server-side synchronization engine 531 of the rate-limit synchronization server computing device 104. To do so, the node-side synchronization engine 523 may update the local rate-limiting counter data stored in the local cache storage medium 522 based on the asynchronous rate-limiting counter data described by the asynchronous configuration data update for the rate-limit decision node computing device A 106A. Furthermore, the node-side synchronization engine 523 may update the local rate-limiting policy data stored in the local cache storage medium 522 based on the asynchronous rate-limiting policy data described by the asynchronous configuration data update for the rate-limit decision node computing device A 106A.

Storing local rate-limiting configuration data in a local cache storage medium is in part intended to increase the speed of retrieving such local rate-limiting configuration data during decision-making for a rate-limiting request. This, coupled with performing rate-limit synchronization independently of rate-limit decision-making, ensures that the asynchronous rate-limiting concepts of the present invention provide efficient means for performing real-time/instantaneous rate-limiting decision-making in high-performance rate-limiting contexts. Accordingly, in some embodiments, transmitting the rate-limiting decision is configured to be performed within a decision latency period from receiving the rate-limiting request. In some of the noted embodiments, the decision latency period is one microsecond.

In some embodiments, the rate-limit synchronization server computing device 104 further comprises a dynamic policy update engine 534. The dynamic policy update engine 534 may be configured to: (i) receive (e.g., from service application computing devices 102 and/or from the rate-limit decision node computing devices 106) ground-truth information about resource costs of various rate-limiting requests; (ii) utilize the received ground-truth information to train a dynamic policy update model that is configured to generate predicted resource costs for various rate-limiting requests; (iii) utilize the trained dynamic policy update model to generate predicted resource costs for particular rate-limiting requests to which the rate-limiting policies stored in the global policy data storage subsystem 533 apply; and (iv) utilize the predicted resource costs for the particular rate-limiting requests to generate one or more updates to the rate-limiting policies stored in the global policy data storage subsystem 533. In some embodiments, subsequent to updating a rate-limiting policy through updating the global rate-limiting policy data associated with the rate-limiting policy, the server-side synchronization engine 531 transmits data objects describing the noted rate-limiting policy updates to the rate-limit decision node computing devices 106.

For example, the dynamic policy update model maybe a machine learning model that is configured to generate predicted resource costs for rate-limiting requests based on at least one of overall system load measures for service applications, timestamps of the rate-limiting requests, tenant identifiers of the rate-limiting requests, user identifiers of the rate-limiting requests, and region identifiers of the rate-limiting request. In an exemplary embodiment, the dynamic policy update model may be used to generate output data that in turn suggest recommended updates to rate-limiting policies that apply to a particular period of time that is deemed to be a high-traffic period of time. In another exemplary embodiment, the dynamic policy update model may be used to generate output data that in turn suggest recommended updates to rate-limiting policies that apply to a particular region that is deemed to be a high-traffic region. In a further exemplary embodiments, the dynamic policy update model may be used to generate output data that in turn suggest recommended updates to rate-limiting policies that apply to a particular tenant identifier and/or a particular user identifier. In yet another exemplary embodiments, the dynamic policy update model may be used to generate output data that in turn suggest recommended updates to rate-limiting policies that apply when the system load measure for a particular service application exceeds a service load threshold.

B. Context-Aware Rate-Limiting

As discussed above, each rate-limiting policy may be associated with a context that defines qualifying criteria and/or operational requirements of the rate-limiting policy. This contextual definition of rate-limiting policies enables flexible architectures for efficiently and conveniently modifying operations of rate-limit service system behaviors in response to new changes in system requirements and/or new changes in the operational environment of the rate-limit service system. In some embodiments, an administrator user profile of a service application may transmit service-originated rate-limiting policy updates to the server-side synchronization engine 531 of the rate-limit synchronization server computing device 104 that enable efficient and convenient modification of rate-limiting policies maintained by the rate-limit synchronization server computing device 104 and enforced by the rate-limit decision node computing devices that are associated with the rate-limit synchronization server computing device 104.

For example, a service-originated rate-limiting policy update may require that a first rate-limiting policy should be deleted, the threshold of a second rate-limiting policy should be changed from "ten approvable requests per five minutes" to "ten approval requests per eight minutes," and qualifying criteria of a third rate-limiting policy should be changed to exclude rate-limiting requests that correspond to a tenant identifier Ti from the coverage of the third rate-limiting policy.

As another example, a service-originated rate-limiting policy update may require that the fail mode descriptor of a first rate-limiting policy should be changed from a fail mode descriptor requiring that all data access requests that correspond to the rate-limiting policy should be allowed in the event of lack of synchronization of a local rate-limiting policy for the rate-limiting policy by the rate-limit synchronization server computing device 104 for a predefined period of time to a fail mode descriptor requiring that all data access requests that correspond to the rate-limiting policy should be denied in the event of lack of synchronization of a local rate-limiting policy for the rate-limiting policy by the rate-limit synchronization server computing device 104 for the predefined period of time, the threshold of a second rate-limiting policy should be changed from "ten approvable requests per five minutes" to "eight approval requests per eight minutes," and a rate-limiting technique descriptor of a third rate-limiting policy should be changed from a sliding window rate-limiting technique to a sliding log rate-limiting technique.

As yet another example, a service-originated rate-limiting policy update may require that qualifying criteria of a first rate-limiting policy should be changed to require that a new user identifier be added to the user identifiers for whom the rate-limiting policy applies, the geographic region of a second rate-limiting should be changed to require that rate-limiting requests whose corresponding service requests originate from Asia are covered by the rate-limiting policy, and the rate-limit threshold measurement unit of a third rate-limiting policy be changed from seconds to milliseconds.

However, while various embodiments of the context aware rate-limiting aspects of the present invention are described with reference to updating global rate-limiting policy data based on service-originated rate-limiting policy updates transmitted to the server-side synchronization engine 531 by service applications, a person of ordinary skill in the relevant technology will recognize that in some embodiments other computing entities (e.g., computing entities associated with administrator user profiles of the rate-limit synchronization server computing device 104 and/or computing entities associated with the rate-limit decision node computing devices) may be configured to transmit rate-limiting policy updates to the server-side synchronization engine 531 that cause modification of global rate-limiting policy data maintained by the global policy data storage subsystem 533.

By providing the ability to modify global rate-limit policy data using interactions with the rate-limit synchronization server computing device 104, various embodiments of the present invention enable performing reliable and efficient modifications in the behavior of the rate-limit decision nodes associated with the rate-limit synchronization server computing device 104 through interaction with a centralized end-point. Moreover, by providing the ability to modify global rate-limit policy data using interactions with the rate-limit synchronization server computing device 104 that also stores the noted global rate-limit policy data, various embodiments of the present invention decrease the reliability challenges resulting from potential loss of global rate-limit policy data updates before final application of the changes to the global rate-limit policy data in accordance with the noted global rate-limit policy data updates, thus increasing the speed and reliability of making the noted changes. Accordingly, in a variety of ways, the context-aware rate-limiting concepts of the present invention increase the efficiency, the reliability, and the operational flexibility of rate-limit service systems.

C. Cost-Aware Rate-Limiting

FIG. 11 is a dataflow diagram of an example process 1100 for performing cost-aware rate-limiting using a rate-limit service system, such as the rate-limit service system 101 of FIG. 1. Via the various operations of the process 1100, a rate-limit service system can efficiently and effectively update rate-limit counters to reflect estimated resource costs of data access operations requested by rate-limiting requests, which in turn increases the operational efficiency and reliability of service applications that utilize the cost-aware rate-limiting concepts described in the present document. While various embodiments of the present invention describe performing cost-aware rate-limiting using the rate-limit service system 101, which has a distributed architecture configured to perform asynchronous rate-limiting, a person of ordinary skill in the relevant technology will recognize that the cost-aware rate-limiting of the present invention can be performed using any collection of one or more rate-limit service systems having any architecture, such as a single rate-limit computing device configured to perform cost-aware rate-limiting using a non-distributed architecture.

The process 1100 begins at operation 1101 when the service proxy receives a service request. In some embodiments, the service proxy 511 receives the service request from a tenant computing device associated with a tenant identifier. In some embodiments, the service request is an HTTP packet that includes at least one of the following in the header of the HTTP packet and/or in the payload of the HTTP packet: (i) the tenant descriptor that describes the tenant identifier, (ii) a user descriptor that describes a user identifier associated with the tenant identifier which is deemed the originator user profile of the service request, (iii) an Internet Protocol (IP) address of a client computing device and/or a client system that is deemed the originator computing device of the service request, (iv) a regional identifier for the originator computing device, (v) a query descriptor describing a type of the service request, and (vi) a parameter describing one or more parameters of the service request.

The service request may seek to perform at least one of the following operations: (i) cause a service application engine 512 of the service application computing device A 102A to perform one or more data retrieval actions with respect to the data stored in a service application storage subsystem 513 of the service application computing device A 102A, and (ii) cause a service application engine 512 of the service application computing device A 102A to perform one or more data modification actions with respect to the data stored in the service application storage subsystem 513.

Although various embodiments of the present invention describe the service application computing device A 102A as having a single service proxy for communication with other computing devices (e.g., with the tenant computing devices and/or with the rate-limit decision nodes), a person of ordinary skill in the relevant technology will recognize that the service application computing device 102 may have any number of service proxies. Furthermore, a person of ordinary skill in the relevant technology will recognize that the service application computing device A 102A may utilize one or more other communication engines (e.g., one or more API gateways) instead of or in addition to the service proxies to enable communicating with other computing devices (e.g., with the tenant computing devices and/or with the rate-limit decision nodes). Moreover, a person of ordinary skill in the relevant technology will recognize that the service application engine 512 may directly communicate with other computing devices (e.g., with the tenant computing devices and/or with the rate-limit decision nodes).

At operation 1102, the service proxy 511 transmits a rate-limiting request associated with the service request to the rate-limit service system 101. The rate-limiting request may be an HTTP packet (e.g., a JSON-based HTTP packet) or a general-purpose Remote Procedure Call (gRPC). The rate-limiting request may include data fields that can be used to extract policy-defining features from the rate-limiting request. For example, policy-defining features may be integrated as part of the header of the rate-limiting request, as part of a request path of the rate-limiting request that describes a target path of the service request in relation to the structure of the data stored in the service application storage subsystem 513, as query parameters of the rate-limiting request, as a tenant descriptor field of the rate-limiting request which is determined based on the tenant descriptor of the service request, as a user descriptor field of the rate-limiting request which is determined based on the user descriptor of the service request, and/or the like. In some embodiments, the service proxy 511 generates and transmits the rate-limiting request in accordance with at least some of the operations of the process 600 described above with reference to the asynchronous rate-limiting concepts of the present invention.

In some embodiments, the rate-limiting request describes an initial cost estimate for the service request, such as an initial cost estimate generated by the service application engine 1112 and/or by the service proxy 1111. In some embodiments, the initial cost estimate for a rate-limiting request is determined based on at least one of an overall operational load on the service application computing device A 102A, the timestamp of the service request, the tenant identifier of the service request, the user identifier of the service request, and the region identifier of the service request. In some embodiments, the initial cost estimate is utilized by the rate-limit service system at operation 1103 to update any rate-limiting counters deemed to correspond to the rate-limiting request before determining whether the updated rate-limiting counters satisfy rate-limiting threshold conditions specified by the rate-limiting policies that apply to the rate-limiting request.

At operation 1103, the rate-limit service system 101 transmits a rate-limiting decision for the rate-limiting request to the service proxy 511 based on rate-limiting counters that are deemed associated with the rate-limiting request. In some embodiments, to generate the rate-limiting decision, the rate-limit service system 101 utilizes rate-limiting configuration data maintained by the rate-limit service system 101 to determine local rate-limiting policies that apply to the rate-limiting decision and subsequently determines whether the policy-defining features of the rate-limiting decision satisfy the determined applicable local rate-limiting policies. In some embodiments, the rate-limit service system 101 generates and transmits the rate-limiting decision in accordance with at least some of the operations of the process 700 described above with the asynchronous rate-limiting concepts of the present invention.

In some embodiments, to determine whether the rate-limiting decision for a rate-limiting request, the rate-limit service system 101 increases any rate-limiting counters deemed to correspond to the rate-limiting request based on an initial cost estimate for the rate-limiting request. In some embodiments, the rate-limit service system 101 simply adds the initial cost estimate to the corresponding rate-limiting counters. In other embodiments, the rate-limit service system 101 utilizes a cost adjustment engine 1131 to adjust the initial cost estimate in accordance with an initial cost adjustment model in order to generate an adjusted cost estimate, and thereafter adds the adjusted cost estimate to the correspond rate-limiting requests. Subsequent to updating the corresponding rate-limiting counters, the rate-limit service system 101 may determine whether the updated rate-limiting counters satisfy the rate-limiting thresholds specified by the rate-limiting configuration data for the noted updated rate-limiting counters, and uses the noted determination to generate the rate-limiting decision for the rate-limiting request.

In some embodiments, the initial cost adjustment model may be configured to determine an adjusted cost estimate for a rate-limiting request based on at least one of the timestamp of the rate-limiting request, the overall system load measure on the service application computing device A 102A, the region identifier of the rate-limiting request, the tenant identifier of the rate-limiting request, and the user identifier of the rate-limiting request. In some embodiments, the initial cost adjustment model is a machine learning model that is trained using ground-truth data generated based on the operational cost data (e.g., observed resource cost estimates) provided to the rate-limit service system at operation 1107, as further described below.

At operation 1104, the service proxy 511 communicates with the service application engine 512 to either enable the data access operations requested by the service request or deny the data access operations requested by the service request based at least in part on the rate-limiting decision obtained from the decision engine 521. In some embodiments, the service proxy 511 is configured to enable the data access operations requested by the service request in response to determining that the rate-limiting decision is an affirmative decision engine, and to deny the data access operations requested by the service request in response to determining that the rate-limiting decision is a negative decision engine. In some embodiments, the rate-limiting decision is deemed by the service proxy 511 as a mere recommendation about whether to enable or deny the data access operations requested by the service request, and service proxy 511 may determine whether to enable the data access operations requested by the service request or deny the data access operations requested by the service request based on run-time configuration settings in addition to the rate-limiting decision communicated to the service proxy 511 by the rate-limit service system 101.

At operation 1105, in response to a communication from the service proxy 511 that enables data access operations requested by the service request, the service application engine 512 performs the data access operations by accessing (e.g., retrieving and/or modifying) the service application storage subsystem 513. In some embodiments, subsequent to performing the data access operations requested by the service request, the service application engine 512 returns data processing outputs that are in turn provided by the service proxy 511 to the tenant computing device associated with the service request.

At operation 1106, subsequent to performing the data access operations requested by the service request, the service application engine 512 transmits operational cost data for the data access operations to the service proxy 511. The operational cost data describe an estimated number of computing operations (e.g., an estimated number of processing clocks) and/or an estimated size of the data accessed by the service application engine 512 in order to perform the data access operations requested by the service request. For example, the operational cost data may describe the number of relational data fields of a relational database that were affected and/or retrieved by the data access operations requested by the service request. As another example, the operational cost data may describe the number of graph nodes of a graph-based database that were affected and/or retrieved by the data access operations requested by the service request. As yet another example, the operational cost data may describe the number of files of a file-based data storage system that were affected and/or retrieved by the data access operations requested by the service request.

At operation 1107, subsequent to receiving the operational cost data from the service application engine 512, the service proxy 511 provides the noted operational cost data to the rate-limit service system 101 (e.g., to a decision node of a rate-limit decision computing device of the rate-limit service system 101 that is associated with the service application computing device A 102A). The operational cost data may be provided as designated fields of a header and/or as designated fields of a payload of a communication packet (e.g., an HTTP communication packet and/or a gRPC communication packet). In some embodiments, the operational cost data are provided as part of a communication packet that includes an identifier of the rate-limiting request and/or an identifier of applicable rate-limiting counters associated with the rate-limiting request as designated fields of a header and/or as designated fields of a payload of the noted communication packet.

At operation 1108, the rate-limit service system 101 determines an estimated operational cost of the rate-limit decision based on the operational cost and uses the estimated operational cost to update any rate-limiting counters used to determine the rate-limiting decision. To do so, the rate-limit service system 101 may be configured to update any rate-limiting counter associated with the rate-limiting request (i.e., any rate-limiting counter used to determine the rate-limiting decision for the rate-limiting request) based on a counter update measure, where the counter update measure is determined based on the estimated operational cost. In this way, the counter update measure may be higher for a rate-limiting request that is deemed to have a higher operational cost and vice versa.

In some embodiments, the counter update measure is a data item that describes a measure of how much a corresponding local rate-limiting counter should be increased by a rate-limit decision node in response to determining an affirmative rate-limiting decision for a rate-limiting request that is associated with a local rate-limiting policy for the local rate-limiting counter. In some embodiments, the counter update measure for each rate-limiting request that is associated with an affirmative rate-limiting decision is one. In some embodiments, the counter update measure for each rate-limiting request that is associated with an affirmative rate-limiting decision is determined based on an estimated resource cost of a service request that is associated with the rate-limiting request. For example, the counter update measure for a rate-limiting request that is associated with a target data retrieval service request may be determined based on a size of the target data and/or based on the cost of searching the target data within a data repository associated with the corresponding tenant identifier. In some embodiments, the estimated resource cost of a service request may be determined based on data provided by the service application associated with the rate-limiting request and/or in accordance with a service request resource cost model maintained by the rate-limit service system 101.

The service request resource cost model may be a machine learning model trained using ground-truth resource cost data associated with relative resource costs of various rate-limiting requests, where the ground-truth resource cost data may be obtained from a cost engine of a storage server system (e.g., an Amazon Web Service cost engine), and where the machine learning model may be configured to process an adjusted final cost estimate for a rate-limiting request based on at least one of the timestamp of the rate-limiting request, the initial cost estimate of the rate-limiting request, the overall system load measure on the service application computing device A 102A, the region identifier of the rate-limiting request, the tenant identifier of the rate-limiting request, and the user identifier of the rate-limiting request.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage computing device, a computer-readable storage substrate, a random or serial access memory array or computing device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage computing devices).

The operations described herein can be implemented as operations performed by an information/data processing apparatus on information/data stored on one or more computer-readable storage computing devices or received from other sources.

The term "data processing apparatus" encompasses all kinds of apparatus, computing devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory computing devices for storing instructions and data. Generally, a computer will also include, or be operatively coupled to receive information/data from or transfer information/data to, or both, one or more mass storage computing devices for storing data, e.g., magnetic, magneto-optical disks, or optical disks. However, a computer need not have such computing devices. Computing devices suitable for storing computer program instructions and information/data include all forms of non-volatile memory, media and memory computing devices, including by way of example semiconductor memory computing devices, e.g., EPROM, EEPROM, and flash memory computing devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display computing device, e.g., a CRT (cathode ray tube) or LCD (liquid crystal display) monitor, for displaying information/data to the user and a keyboard and a pointing computing device, e.g., a mouse or a trackball, by which the user can provide input to the computer. Other kinds of computing devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a computing device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for asynchronous rate-limiting at a rate-limit decision node, the apparatus comprising at least one processor and at least one non-transitory memory comprising program code, wherein the at least one non-transitory memory and the program code are configured to, with the at least one processor, cause the apparatus to perform operations configured to at least:
receive a rate-limiting request for a service application;
extract one or more policy-defining parameters from the rate-limiting request;
query a local cache storage medium associated with the rate-limit decision node to identify one or more local rate-limiting policies associated with the rate-limiting request, wherein the local cache storage medium is configured to receive one or more asynchronous configuration data updates to the one or more local rate-limiting policies from a rate-limit synchronization server, and further wherein the rate-limit decision node is configured to update the one or more local rate-limiting policies based on the one or more asynchronous configuration data updates;
determine, based on the one or more policy-defining parameters and the one or more local rate-limiting policies, a rate-limiting decision for the rate-limiting request; and
transmit the rate-limiting decision to the service application in response to the rate-limiting request.

2. The apparatus of claim 1, wherein determining the rate-limiting decision comprises:
for each local rate-limiting policy of the one or more local rate-limiting policies: determining a related subset of the one or more policy-defining parameters for the local rate-limiting policy,
querying the local cache storage medium based on the related subset to obtain a local rate-limiting counter for the rate-limiting request with respect to the local rate-limiting policy, and
determining a per-policy rate-limiting determination for the local rate-limiting policy based on the local rate-limiting counter and the local rate-limiting policy; and
determining the rate-limiting decision based on each per-policy rate-limiting determination for a local rate-limiting policy of the one or more local rate-limiting policies.

3. The apparatus of claim 2, wherein determining the per-policy rate-limiting determination for a local rate-limiting policy of the one or more local rate-limiting policies comprises:
determining whether the local rate-limiting counter satisfies the local rate-limiting policy;
in response to determining that the local rate-limiting counter satisfies the local rate-limiting policy, determining an affirmative per-policy rate-limiting determination; and
in response to determining that the local rate-limiting counter fails to satisfy the local rate-limiting policy, determining a negative per-policy rate-limiting determination.

4. The apparatus of claim 3, wherein the at least one non-transitory memory and the program code are further configured to, with the at least one processor, cause the apparatus to perform operations configured to at least:
in response to determining that the local rate-limiting counter satisfies the local rate-limiting policy, for each local rate-limiting policy of the one or more local rate-limiting policies, update the local rate-limiting counter in accordance with a counter update measure.

5. The apparatus of claim 4, wherein the counter update measure is determined based on an estimated resource cost of the rate-limiting request for the service application.

6. The apparatus of claim 4, wherein the at least one non-transitory memory and the program code are further configured to, with the at least one processor, cause the apparatus to perform operations configured to at least:
subsequent to transmitting the rate-limiting decision, transmitting the local rate-limiting counter and a synchronized local rate-limiting counter to the rate-limit synchronization server.

7. The apparatus of claim 6, wherein the rate-limit synchronization server is configured to:
determine whether the synchronized local rate-limiting counter exceeds the local rate-limiting counter;
in response to determining that the synchronized local rate-limiting counter exceeds the local rate-limiting counter, update a global rate-limiting counter for the rate-limiting request with respect to the local rate-limiting policy based on the local rate-limiting counter; and in response to determining that the synchronized local rate-limiting counter fails to exceed the local rate-limiting counter, update the global rate-limiting counter for the rate-limiting request with respect to the local rate-limiting policy based on a measure of deviation of the local rate-limiting counter and the synchronized local rate-limiting counter.

8. The apparatus of claim 1, wherein:
the local cache storage medium is configured to maintain local rate-limiting configuration data comprising the one or more local rate-limiting policies, and
the rate-limit decision node is configured to update the local rate-limiting configuration data based on the one or more asynchronous configuration data updates.

9. The apparatus of claim 8, wherein the one or more asynchronous configuration data updates are configured to be transmitted to the local cache storage medium by the rate-limit synchronization server at a configuration data update propagation time that is subsequent to a local query time associated with identifying the one or more local rate-limiting policies by the rate-limit decision node.

10. The apparatus of claim 9, wherein the configuration data update propagation time is a counter data update propagation time.

11. The apparatus of claim 8, wherein:
the local rate-limiting configuration data comprises local rate-limiting policy data comprising the one or more local rate-limiting policies and local rate-limiting counter data, and
the one or more asynchronous configuration data updates comprise one or more asynchronous policy data updates associated with the local rate-limiting policy data and one or more asynchronous counter data updates associated with the local rate-limiting counter data.

12. The apparatus of claim 11, wherein:
the one or more asynchronous policy data updates are determined based on global rate-limiting policy data maintained by the rate-limit synchronization server, and
the one or more asynchronous counter data updates are determined based on global rate-limiting counter data maintained by the rate-limit synchronization server.

13. The apparatus of claim 12, wherein:
the global rate-limiting policy data is stored on a hard disk of the rate-limit synchronization server, and
the global rate-limiting counter data is stored on a main memory of the rate-limit synchronization server.

14. The apparatus of claim 12, wherein:
the global rate-limiting policy data is stored as a relational database table, and
the global rate-limiting counter data is stored as a collection of key-value pairs.

15. The apparatus of claim 1, wherein:
the rate-limiting request is associated with a tenant identifier, a user identifier, and a service identifier, and
the one or more policy-defining parameters comprise one or more tenant-related parameters associated with the tenant identifier, one or more user-related parameters associated with the user identifier, and one or more request-related parameters associated with the service identifier.

16. The apparatus of claim 1, wherein each local rate-limiting policy of the one or more local rate-limiting policies is characterized by:
a parameter descriptor identifying parameter types for a related subset of the one or more policy-defining parameters that is associated with the local rate-limiting policy,
a rate limit threshold value descriptor,
a rate limit threshold measurement unit descriptor,
a rate-limiting technique descriptor,
a target path descriptor, and
a fail mode descriptor.

17. The apparatus of claim 1, wherein transmitting the rate-limiting decision is configured to be performed within a decision latency period from receiving the rate-limiting request.

18. The apparatus of claim 17, wherein the decision latency period is one microsecond.

19. A computer-implemented method for asynchronous rate-limiting at a rate-limit decision node, the computer-implemented method comprising:
receiving a rate-limiting request for a service application;
extracting one or more policy-defining parameters from the rate-limiting request;
querying a local cache storage medium associated with the rate-limit decision node to identify one or more local rate-limiting policies associated with the rate-limiting request, wherein the local cache storage medium is configured to receive one or more asynchronous configuration data updates from a rate-limit synchronization server, and further wherein the rate-limit decision node is configured to update the one or more local rate-limiting policies based on the one or more asynchronous configuration data updates;
determining, based on the one or more policy-defining parameters and the one or more local rate-limiting policies, a rate-limiting decision for the rate-limiting request; and
transmitting the rate-limiting decision to the service application in response to the rate-limiting request.

20. A computer program product for asynchronous rate-limiting at a rate-limit decision node, the computer program product comprising at least one non-transitory computer-readable storage medium having computer-readable program code portions stored therein, the computer-readable program code portions configured to:
receive a rate-limiting request for a service application;
extract one or more policy-defining parameters from the rate-limiting request;
query a local cache storage medium associated with the rate-limit decision node to identify one or more local rate-limiting policies associated with the rate-limiting request, wherein the local cache storage medium is configured to receive one or more asynchronous configuration data updates from a rate-limit synchronization server, and further wherein the rate-limit decision node is configured to update the one or more local rate-limiting policies based on the one or more asynchronous configuration data updates;
determine, based on the one or more policy-defining parameters and the one or more local rate-limiting policies, a rate-limiting decision for the rate-limiting request; and
transmit the rate-limiting decision to the service application in response to the rate-limiting request.

* * * * *